United States Patent
Zhang et al.

(10) Patent No.: US 11,306,205 B2
(45) Date of Patent: Apr. 19, 2022

(54) ADDITION-CURABLE SILICONE RUBBER COMPOSITION

(71) Applicant: Momentive Performance Materials Inc., Waterford, NY (US)

(72) Inventors: Huiping Zhang, Clifton Park, NY (US); Srividhya Marimuthu, Bangalore (IN); Gunnar Hoffmueller, Odenthal (DE); John Mitchell Huggins, Leverkusen (DE); Enise Michalski, Langenfeld (DE)

(73) Assignee: MOMENTIVE PERFORMANCE MATERIALS, INC, Waterford, NY (US)

( * ) Notice: Subject to any disclaimer, the term of this patent is extended or adjusted under 35 U.S.C. 154(b) by 0 days.

(21) Appl. No.: 16/472,282

(22) PCT Filed: Dec. 20, 2017

(86) PCT No.: PCT/US2017/067503
§ 371 (c)(1),
(2) Date: Jun. 21, 2019

(87) PCT Pub. No.: WO2018/119029
PCT Pub. Date: Jun. 28, 2018

(65) Prior Publication Data
US 2019/0375937 A1    Dec. 12, 2019

(30) Foreign Application Priority Data
Dec. 23, 2016 (EP) .................................. 16206587

(51) Int. Cl.
*C08L 83/04* (2006.01)
*C08J 5/12* (2006.01)

(52) U.S. Cl.
CPC ............ *C08L 83/04* (2013.01); *C08J 5/121* (2013.01); *C08J 2383/07* (2013.01); *C08L 2205/025* (2013.01); *C08L 2205/16* (2013.01)

(58) Field of Classification Search
CPC ............ C08L 83/04; C08L 2205/025; C08L 2205/16; C08J 5/121; C08J 2383/07
(Continued)

(56) References Cited

U.S. PATENT DOCUMENTS 3,159,601 A    12/1964   Ashby
3,159,662 A    12/1964   Ashby
(Continued)

FOREIGN PATENT DOCUMENTS

EP    122008    10/1984
EP    146307    6/1985
(Continued)

OTHER PUBLICATIONS

B. Kerboua "Adhesion between addition-curable silicone elastomer and nylon using diallylbisphenol A as adhesion promoter", Journal of Applied Polymer Science 89(13), pp. 3496-3499 (Year: 2003).*
(Continued)

*Primary Examiner* — Michael M. Bernshteyn
(74) *Attorney, Agent, or Firm* — Joseph Waters; McDonald Hopkins LLC

(57) ABSTRACT

The present invention relates to an addition-curable silicone rubber composition having self-bonding capability. The addition-curable silicone rubber composition exhibits self-bonding capability in particular to substrates that contain residual hydroxyl groups or other residual hydrosilyl-reacting groups on their surface, including polycarbonate, polyester, polyamide, polysulfone, polyurethane, phenolic resin, epoxy resin, cellulose, glass and the mixture thereof.

17 Claims, 1 Drawing Sheet

– Proposed bonding mechanism between LSR and Substrate

Migration/Surface enrichment ⟶ Hydrosilylation ⟶ Dehydrogenative condensation

(58) Field of Classification Search
USPC .......................................................... 524/493
See application file for complete search history.

(56) References Cited

U.S. PATENT DOCUMENTS

| | | | |
|---|---|---|---|
| 3,419,593 | A | 12/1968 | Willing |
| 3,715,334 | A | 2/1973 | Karstedt |
| 3,775,452 | A | 11/1973 | Karstedt |
| 3,814,730 | A | 6/1974 | Karstedt |
| 4,510,094 | A | 4/1985 | Drahnak |
| 4,530,879 | A | 7/1985 | Drahnak |
| 4,640,939 | A | 2/1987 | Cavezzan et al. |
| 6,645,638 | B2 | 11/2003 | Fujiki et al. |
| 6,780,518 | B2 | 8/2004 | Azechi et al. |
| 6,887,932 | B2 | 5/2005 | Azechi |
| 7,273,911 | B2* | 9/2007 | Fehn ................... C08L 83/04 525/478 |
| 2002/0028335 | A1* | 3/2002 | Fujiki ................. C08L 83/04 428/447 |
| 2002/0032270 | A1 | 3/2002 | Azechi |
| 2002/0132891 | A1 | 9/2002 | Azechi |
| 2003/0019960 | A1 | 1/2003 | Magel |
| 2004/0161618 | A1* | 8/2004 | Griswold ............... C08J 3/03 428/447 |
| 2010/0210794 | A1* | 8/2010 | Frese .................. C08L 83/04 525/478 |
| 2013/0052356 | A1 | 2/2013 | Li |
| 2014/0051806 | A1* | 2/2014 | Kato ................... C09J 183/04 524/866 |

FOREIGN PATENT DOCUMENTS

| | | |
|---|---|---|
| EP | 1172414 | 1/2002 |
| EP | 1672031 | 6/2006 |
| WO | 2009037156 | 3/2009 |
| WO | 2011107592 | 9/2011 |

OTHER PUBLICATIONS

K. Khoudary et al. "Bisphenol-A Resole Resins in Preparation Aqueous Adhesives for Bonding Silicon Rubber-to-Metal", Asian Journal of Chemistry, 24(8), pp. 3629-3632 (Year: 2012).*

Kerboua et al. "Adhesion between addition-curable silicone elastomer and nylon using diallylbisphenol A as adhesion promoter", Journal of Applied Polymer Science, vol. 89, No. 13, (2002), pp. 3496-3499 (Year: 2002).*

Khoudary et al. "Bisphenol-A Resole Resins in Preparation Aqueous Adhesives for Bonding Silicon Rubber-to-Metal", Asian Journal of Chemistry, vol. 24, No. 8, (2012), pp. 3629-3632 (Year: 2012).*

Patent Cooperation Treaty (PCT), International Search Report and Written Opinion for Application PCT/US2017/067503 filed Dec. 20, 2017, dated Feb. 26, 2018, International Searching Authority, EP.

* cited by examiner

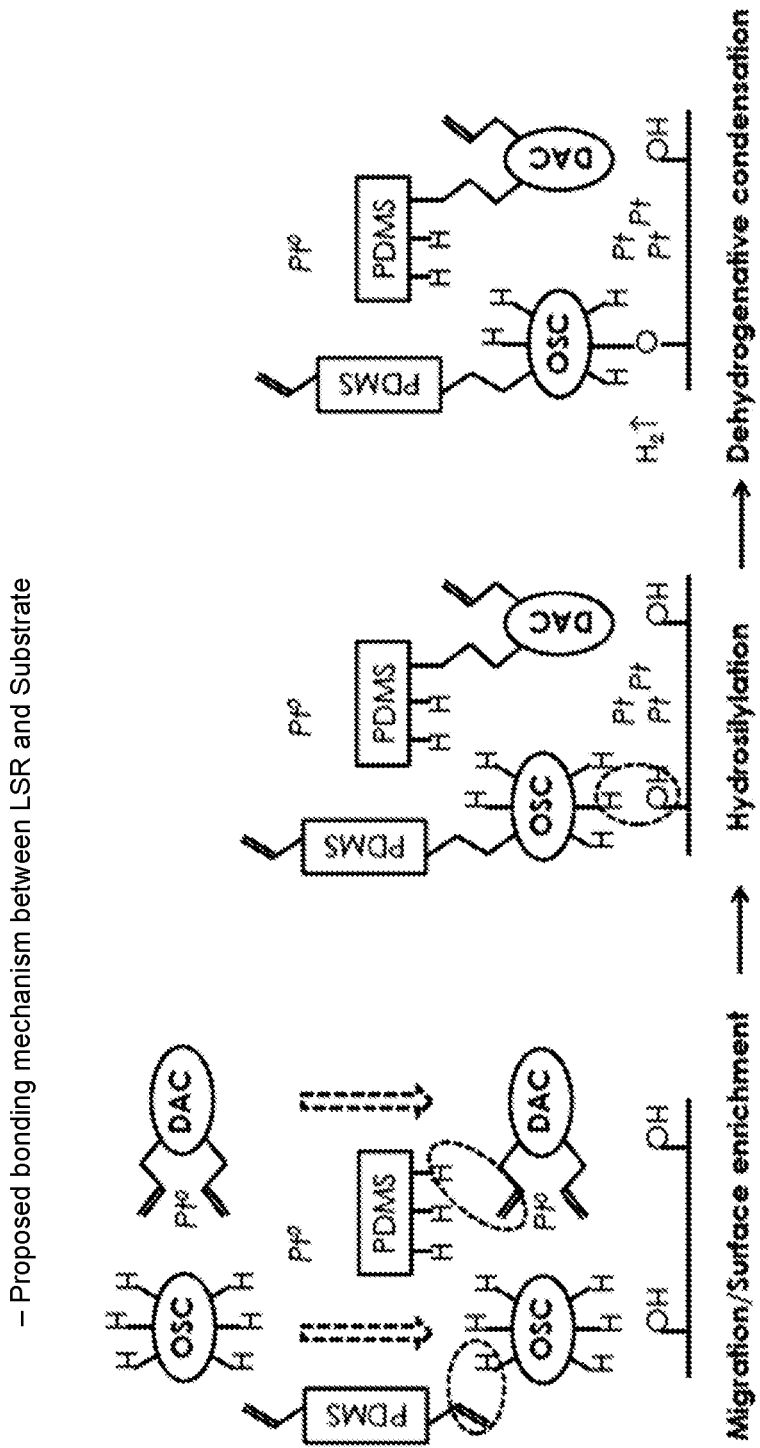

ADDITION-CURABLE SILICONE RUBBER COMPOSITION

The present application 35 U.S.C. 371 national stage filing of PCT Application No. PCT/US2017/067503 filed Dec. 20, 2017, which claims priority to and the benefit of European Application No. 16206587.4 filed Dec. 23, 2016, the disclosure of which are incorporated herein by reference in their entirety.

The present invention relates to an addition-curable silicone rubber composition, which, in particular, has self-bonding capability. The addition-curable silicone rubber composition according to the invention (in the following sometimes referred to as liquid silicone rubber composition (LSR)) exhibits self-bonding capability to various thermoplastic substrates. Bonding addition-cured LSR to thermoplastics usually requires the application of a primer on substrate surface. The new self-bonding LSR composition according to the invention provides a primer-less solution, eliminating the need for a separate secondary operation process and enabling direct two-shot or multiple-shot overmolding process. There have been a number of publications in recent years addressing different methods of bonding addition-cured LSR to thermoplastics without the use of primers. Most of these approaches involve the use of an organosilicon compound (OSC) containing at least one phenylene group and at least one hydrosilyl (SiH) group in the self-bonding LSR composition. For example a representative OSC (OSC-1) is shown below:

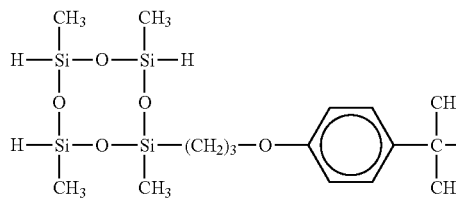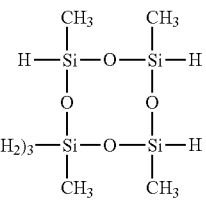

Adding OSC alone to a typical addition-cured LSR formulation, however, is not sufficient to generate robust bonding performance. Additional ingredients are usually needed in the LSR composition to provide firm adhesion to thermoplastics while maintaining good release from metals, allowing a smooth two-shot injection molding process to produce integrated silicone/thermoplastic articles. A third functionality in addition to phenylene and SiH can also be incorporated in the OSC molecule to improve LSR's bonding performance. U.S. Pat. No. 6,780,518 (US2002132891A1) discloses the use of epoxy functionalized OSC as the adhesion agent in LSR. U.S. Pat. No. 6,645,638 (US2002028335A1) employs a selective group of ester compounds along with OSC in its self-bonding LSR composition. In the examples of US2002028335A1 comparatively high amounts of the OSC and the ester compounds are used. U.S. Pat. No. 6,887,932 (US2002032270A1) utilizes a functional siloxane polymer together with OSC in the LSR composition. The claimed functional siloxane polymer is immiscible with LSR and can react with the silicone material in LSR through hydrosilylation. U.S. Pat. No. 8,916,646 uses the combination of bi-functional organohydrogenpolysiloxane and OSC in LSR. In the absence of this bi-functional polymer, the adhesion property suffers. U.S. Pat. No. 7,273,911 relates to an addition-crosslinking silicone composition comprising at least two adhesion promoters.

A frequently observed problem during the vulcanization of rubber compositions in a mold to form cured products is that additives tend to migrate from the rubber composition and deposit on the mold. Repeated curing of the rubber compositions in the mold thereby causes the material to buildup on the mold. The buildup of material on the mold is commonly referred to as "mold fouling". Mold fouling reduces the aesthetic value of the molded products, and can degrade the physical properties of the molded product. Cleaning of the molds is rather costly and tend to damage and/or contaminate molds. Moreover, production is lost when molds are being cleaned. The present invention also attempts to reduce mold fouling and thereby the frequency with which molds must be cleaned.

It is well recognized that polyvalent aromatic compounds such as OSC and aromatic compounds such as aromatic diallyl compounds (DAC) are subject to color formation and yellowing upon oxidation during ageing at higher temperatures and after exposure to UV light, including daylight. Thus another objective of this invention is to provide for strong bonding to organic substrates at low levels of use, in particular, also at high temperatures, such as 120° C., to avoid delamination issues during typical multicomponent molding processes, whereby silicone rubber could detach from plastics during the demolding step, yielding defective articles. Also the aromatic character of OSC and DAC additives have a limited compatibility with the siloxane matrix, leading to turbidity and haze in the subsequent cured rubber articles. Turbidity and haze are detrimental to the manufacture of optically clear articles and can also have a negative influence on the ability to color articles with the use of pigments. It is also known that incorporating high level of nonsiloxane additives in silicone compositions can cause embrittlement to vulcanized silicone rubber. The cured articles lose ductility and become brittle.

In an attempt to overcome the above problems this invention surprisingly unveils the synergy between organosilicon compound containing at least one polyvalent aromatic group (OSC) and an aromatic compound with at least two unsaturated hydrocarbyl groups, which aromatic compound does not contain a siloxane group, in particular, diallyl compounds (DAC) that enable the bonding of LSR to any substrate that contains residual hydroxyl group on its surface, including polycarbonate (PC), polyester, polyurethane, poly(phenylene oxide), polysulfone, poly(vinyl alcohol), phenolic resin, epoxy resin, cellulose and glass, or to any substrate that contains residual functional groups that can react with SiH, including polyamide and polyetherimide. These aromatic compounds are immiscible with LSR and can migrate to LSR surface.

In accordance with the present invention there is provided an addition-curable silicone rubber composition, comprising:

(A) at least one polyorganosiloxane having at least two unsaturated hydrocarbyl residues, (B) at least one polyorganohydrogensiloxane,
(C) at least one hydrosilylation catalyst, comprising a transition metal,
(D) at least one organosilicon compound containing at least one polyvalent aromatic group, which is not directly attached to a silicon atom, and at least one Si—H group, different from compound B),
(E) at least one aromatic compound with at least two unsaturated hydrocarbyl residues, which does not contain a siloxane group, and does not contain an ester group,
(F) optionally one or more filler,
(G) optionally one or more auxiliary additives.

In a preferred embodiment of the addition-curable silicone rubber composition according to the invention, component (A) is selected from one or more polyorganosiloxanes of the general formula (1):

$$[M_aD_bT_cQ_dZ_e]_m \quad (1)$$

wherein
a=0-10
b=0-2000
c=0-50
d=0-10
e=0-300
m=1-1000, with
a+b+c+d+e≥2, and
M=$R_3SiO_{1/2}$, or M*
D=$R_2SiO_{2/2}$, or D*
T=$RSiO_{3/2}$, or T*
Q=$SiO_{4/2}$,
Z is a divalent optionally substituted hydrocarbyl bridging group with up to 14 carbon atoms between two siloxy groups as defined before,
wherein R is selected from optionally substituted hydrocarbyl groups with up to 30 carbon atoms and poly($C_2$-$C_4$)-alkylene ether groups with up to 1000 alkylene oxy units, the groups R being free of aliphatic unsaturation, and wherein M*=$R^1_pR_{3-p}SiO_{1/2}$, D*=$R^1_qR_{2-q}SiO_{2/2}$, T*=$R^1SiO_{3/2}$, wherein
p=1-3,
q=1-2, and
$R^1$ is selected from unsaturated optionally substituted hydrocarbyl groups with up to 30 carbon atoms, with the proviso that there are at least two groups selected from M*, D* and T*.

In a preferred embodiment of the addition-curable silicone rubber composition according to the invention component (B) is selected from one or more polyorganohydrogensiloxanes of the general formula (2):

$$[M^1_{a2}D^1_{b2}T^1_{c2}Q_{d2}Z_{e2}]_{m2} \quad (2)$$

wherein the siloxy units
$M^1$=M, as defined above, or M**,
$D^1$=D, as defined above, or D**,
$T^1$=T, as defined above, or T**,
Q as defined above,
Z as defined above,
M=$HR_2SiO_{1/2}$, D=$HRSiO_{2/2}$, T**=$HSiO_{3/2}$,
a2=0.01-10 preferably =2-5, most preferably =2
b2=0-1000 preferably =10-500
c2=0-50 preferably =0
d2=0-5 preferably =0
e2=0-3 preferably =0
m2=1-1000, preferably =1-500, most preferably =1,
with the proviso that there are at least two groups selected from M, D and T**.

In a preferred embodiment of the addition-curable silicone rubber composition according to invention component (C) is selected from hydrosilylation catalysts comprising platinum.

Component (D) is at least one organosilicon compound containing at least one polyvalent aromatic group, which is not directly attached to a silicon atom, and at least one Si—H group, different from compound (B). The term "which is not directly attached to a silicon atom" is intended to mean that there is no bond of a Si atom to a carbon atom being part of a polyvalent aromatic group, in particular, there is no Si-phenylene-Si group.

In a preferred embodiment of the addition-curable silicone rubber composition according to the invention component (D) is an organosilicon compound comprising one or more straight-chain or cyclic optionally substituted organosiloxane moieties containing 1 to 30 silicon atoms, at least one SiH group, and at least one polyvalent aromatic group, which is not directly attached to a silicon atom.

The at least one aromatic compound (E) is an aromatic compound that has at least two, preferably two, three or four, more preferably two unsaturated hydrocarbyl groups, preferably allyl groups. The aromatic compound (E) does not contain a siloxane group, that is, it does not comprise a Si—O—Si moiety. The aromatic compound (E) also does not contain an ester group (—C(═O)—O— or —O—C(═O)—). The use of aromatic compounds (E) which do not contain an ester group surprisingly improves adhesion to plastics, such as polycarbonates, at high temperatures, such as 120° C. This avoids delamination issues during typical multicomponent molding processes, whereby the silicone rubber could detach from plastics during the demolding step, yielding defective articles.

Since ester-functional compounds may cause mold fouling, preferably the addition-curable silicone rubber composition of the invention does not contain a compound having at least one ester group in a molecule and at least one aliphatic unsaturated group. Further preferably the addition-curable silicone rubber composition does not contain a compound having at least one ester group in a molecule.

The unsaturated hydrocarbyl group is in particular an unsaturated aliphatic group having preferably up to 20, preferably up to 6 carbon atoms and optionally one or more heteroatoms. Most preferably the unsaturated hydrocarbyl group comprises an allyl group, which for example can be attached to the aromatic group via a carbon atom, or an oxygen atom (—O—). The aromatic compound (E) comprises at least one aromatic group, preferably having 6 to 10 carbon atoms, most preferably at least one or two phenyl moieties (which may be linked by a linker group or which may be also present as a biphenyl group). The aromatic group(s) in the aromatic compound (E) optionally may have additional, preferably 1 or 2 substituents apart from the unsaturated hydrocarbyl group. Such additional substituents may be selected for example from hydroxyl, halogen, C1-C6-alkyl, C1-C6-alkoxy, and tri(C1-C6-hydrocarbyl)siloxy.

In a particular preferred embodiment of the addition-curable silicone rubber composition according to the invention the aromatic compound (E) is a compound which comprises at least two, three or four allyl groups, preferably two allyl groups. Particularly preferred is a diallyl compound (E) which is selected from the group consisting of an aromatic compound of the formula (3):

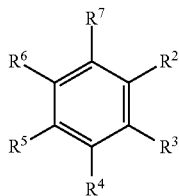
(3)

wherein $R^2$ to $R^7$ are the same or different from each other and are selected from the group consisting of hydrogen, hydroxy, halogen, —$R^8$, wherein $R^8$ is a saturated or unsaturated, optionally substituted hydrocarbyl group with up to 20 carbon atoms, preferably with up to 6 carbon atoms, —O—$R^9$, wherein $R^9$ is a saturated or unsaturated optionally substituted hydrocarbyl group with up to 20 carbon atoms, preferably with up to 6 carbon atoms, with the proviso that the compound of formula (3) comprises at least two unsaturated, in particular, aliphatic hydrocarbyl groups, preferably at least two, more preferably two allyl groups, and an aromatic compound of the formula (4):

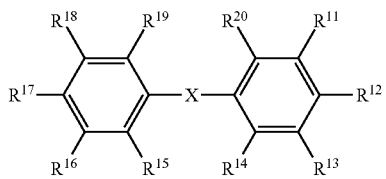
(4)

wherein $R^{11}$ to $R^{20}$ are the same or different from each other and are selected from the group consisting of hydrogen, hydroxy, halogen, —$R^{21}$, wherein $R^{21}$ is a saturated or unsaturated optionally substituted hydrocarbyl group with up to 20 carbon atoms, preferably with up to 6 carbon atoms, —O—$R^{22}$, wherein $R^{22}$ is a saturated or unsaturated optionally substituted hydrocarbyl group with up to 20 carbon atoms, preferably with up to 6 carbon atoms, and a silyloxy group of the formula —OSi$R^{24}R^{25}R^{26}$, wherein $R^{24}$, $R^{25}$, and $R^{26}$ are independent from each other selected from optionally substituted hydrocarbyl group with up to 20 carbon atoms, preferably with up to 6 carbon atoms, X is selected from the group consisting of the groups:
single bond,
—$R^{27}$—, wherein $R^{27}$ is a divalent linear or cyclic saturated optionally substituted hydrocarbyl group with up to 20 carbon atoms,
—C(O)—,
—S(O)$_2$—,
—S(O)—,
—S—
—O—Si($R^{28}$)$_2$—O—, wherein $R^{28}$ is independently selected from the group of a halogen, and a saturated or unsaturated hydrocarbyl group with up to 6 carbon atoms, and
—O—
with the proviso that the compound of formula (4) comprises at least two unsaturated, in particular, aliphatic hydrocarbyl groups, preferably at least two, more preferably two allyl groups.

Compounds (E) of formula (3) or (4) may also comprise allyl groups and vinyl groups (i.e. —CH=CH$_2$-groups which are not bound to a —CH$_2$ group). An example of a group comprising such vinyl groups is a group of formula —O—Si(—CH$_3$)$_2$(—CH=CH$_2$), or a vinyl group attached to an aromatic group.

In a further preferred embodiment of the addition-curable silicone rubber composition according to the invention the diallyl compound (E) is selected from the group consisting of the compounds of the formula:

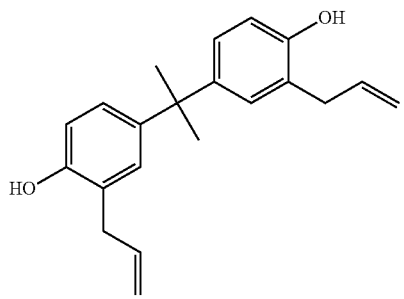 [SMILES: C=CCc1cc(C(C)(C)c2ccc(O)c(CC=C)c2)ccc1O]

(2-allyl-4-[1-(3-allyl-4-hydroxy-phenyl)-1-methyl-ethyl]phenol (2,2'-diallyl bisphenol A))

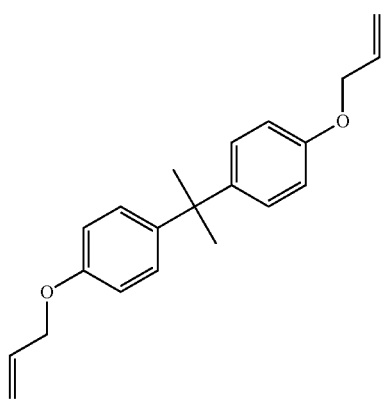 [SMILES: C=CCOc1ccc(C(C)(C)c2ccc(OCC=C)cc2)cc1]

(1-allyloxy-4-[1-(4-allyloxyphenyl)-1-methyl-ethyl]benzene (bisphenol A diallyl ether)))

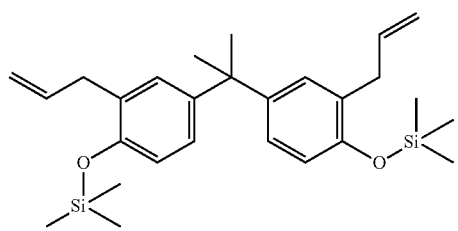 [SMILES: C=CCc1cc(C(C)(C)c2ccc(O[Si](C)(C)C)c(CC=C)c2)ccc1O[Si](C)(C)C]

([2-allyl-4-[1-(3-allyl-4-trimethylsilyloxy-phenyl)-1-methyl-ethyl]phenoxy]-trimethyl-silane))

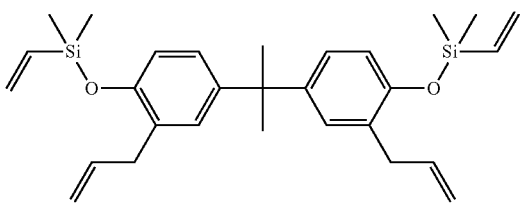 [SMILES: C=CCc1cc(C(C)(C)c2ccc(O[Si](C)(C)C=C)c(CC=C)c2)ccc1O[Si](C)(C)C=C]

([2-allyl-4-[1-[3-allyl-4-[dimethyl(vinyl)silyl]oxy-phenyl]-1-methyl-ethyl]phenoxy]-dimethyl-vinyl-silane).

In a further preferred embodiment of the addition-curable silicone rubber composition according to the invention component (F) is selected from reinforcing fillers having a BET surface area of 50 m²/g or more.

In a further preferred embodiment of the addition-curable silicone rubber composition according to the invention, it comprises:
  100 parts by weight of the component (A),
  0.01 to 100 parts by weight of the component (B)
  0.5 to 1000, preferably 1 to 100 ppm of the component (C) based on the weight amount of the transition metal and based on the total weight of components (A) and (B),
  0.01 to 10 parts by weight of component (D)
  0.01 to 10 parts by weight of component (E),
  0 to 100 parts by weight of component (F), and
  0 to 100 parts by weight of component (G).

In a preferred embodiment the addition-curable silicone rubber composition according to the invention comprises per 100 parts by weight of the component (A):
  0.05 to 2 parts by weight of component (D), preferably 0.1 to 1.75 parts by weight of component (D), and/or
  0.02 to 1 parts by weight of component (E), preferably 0.03 to 0.75 parts by weight of component (E), more preferably 0.05 to 0.5 parts by weight of component (E).

The present invention further relates to cured silicone rubber composition, obtained by curing the addition-curable silicone rubber composition as defined herein.

The present invention further relates to the use of the addition-curable silicone rubber composition as defined herein for the manufacture of a composite material, comprising a substrate and the cured silicone rubber composition on at least one part of the surface of the substrate.

The present invention further relates to a composite material, comprising a substrate and the cured silicone rubber composition as defined herein on the surface of such substrate. Preferably in such composite material the substrate is selected from the group consisting of polycarbonate, polyester, polyurethane, poly(phenylene oxide), polysulfone, polyvinylalcohol, phenolic resin, epoxy resin, polyamide, polyetherimide, cellulose, glass, and the mixture thereof.

The present invention further relates to a method of manufacturing a composite material, wherein a substrate or a carrier that contains residual hydrosilyl-reacting groups (e.g. hydroxyl group) is coated with or is embedded in the addition-curable silicone rubber composition as defined in any of the previous claims and thereafter the addition-curable silicone rubber composition is cured on the surface of said substrate. In a preferred embodiment of such method the substrate is a thermoplastic resin, and the method at first comprises molding of the thermoplastic resin and thereafter the addition-curable silicone rubber composition as defined herein is over-molded onto the thermoplastic part in the same molding equipment and cured.

DETAILED DESCRIPTION OF THE COMPONENTS OF THE INVENTION

Component (A)

The inventive composition comprises at least one polyorganosiloxane having at least two unsaturated hydrocarbyl residues (component (A)). Component (A) may include one or more polyorganosiloxanes having in average at least two alkenyl groups. Suitable components (A) can be described by the general formula (1), $$[M_a D_b T_c Q_d Z_e]_m \quad (1)$$

wherein the indices in formula (1) represent the ratios of the siloxy units M, D, T and Q, which can be distributed blockwise or randomly in the polysiloxane. Within a polysiloxane each siloxane unit can be identical or different and
  a=0-10
  b=0-2000
  c=0-50
  d=0-10
  e=0-300
  m=1-1000
  a+b+c+d+e≥2, and
  M=R$_3$SiO$_{1/2}$, or M*
  D=R$_2$SiO$_{2/2}$, or D*
  T=RSiO$_{3/2}$, or T*
  Q=SiO$_{4/2}$,
  Z is a divalent optionally substituted hydrocarbyl bridging group with up to 14 carbon atoms between two siloxy groups as defined before,
  wherein R is selected from optionally substituted hydrocarbyl groups with up to 30 carbon atoms and poly(C$_2$-C$_4$)-alkylene ether groups with up to 1000 alkylene oxy units, the groups R being free of aliphatic unsaturation, and wherein $$M^* = R^1_p R_{3-p} SiO_{1/2},$$

$$D^* = R^1_q R_{2-q} SiO_{2/2},$$

$$T^* = R^1 SiO_{3/2},$$

wherein
  p=1-3,
  q=1-2, and
  R$^1$ is selected from unsaturated optionally substituted hydrocarbyl groups with up to 30 carbon atoms, the unsaturated optionally substituted hydrocarbyl being preferably alkenyl groups,
  with the proviso that there are at least two groups selected from M*, D* and T*.

Preferably a, b, c, d and m being such that the viscosity of component (A) at 25° C. is less than 100000 mPa·s (measured at a shear rate of D=10 s$^{-1}$ at 25° C.).

The viscosity of component (A) refers to the viscosity of a single component (A) or a mixture of components (A). The latter case of the mixture includes with it the presence of individual components (A) that may have a viscosity exceeding 100000 mPa·s at 25° C., for example resinous components (A) that comprise Q and or T units.

In formula (1) the indices should suitably represent the average polymerisation degree P$_n$ based on the average number molecular mass M$_n$.

In the formula (1):
  M=R$_3$SiO$_{1/2}$, or M*
  D=R$_2$SiO$_{2/2}$, or D*
  T=RSiO$_{3/2}$, or T*
  Q=SiO$_{4/2}$, divalent Z, which are bridging groups between siloxy groups above, wherein each R, which may be the same or different, is preferably selected from optionally substituted alkyl with up to 30 carbon atoms, optionally substituted aryl with up to 30 carbon atoms, poly($C_2$-$C_4$)-alkylene ether with up to 1000 alkylene oxy units, the groups R being free of aliphatic unsaturation, and wherein $M^*=R^1_p R_{3-p}SiO_{1/2}$, $D^*=R^1_q R_{2-q}SiO_{2/2}$, $T^*=R^1 SiO_{3/2}$, wherein p=0-3, preferably 1-3, q=1-2, and Z is as defined below.

R is preferably selected from n-, iso, or tertiary alkyl, alkoxyalkyl, $C_5$-$C_{30}$-cyclic alkyl, or $C_6$-$C_{30}$-aryl, alkylaryl, which groups can be substituted in addition by one or more O-, N-, S- or F-atom, or poly($C_2$-$C_4$)-alkylene ethers with up to 500 alkylene oxy units, the groups R being free of aliphatic unsaturation, Examples of suitable monovalent hydrocarbon radicals include alkyl radicals, preferably such as $CH_3$—, $CH_3CH_2$—, $(CH_3)_2CH$—, $C_8H_{17}$— and $C_{10}H_{21}$—, and cycloaliphatic radicals, such as cyclohexylethyl, aryl radicals, such as phenyl, tolyl, xylyl, aralkyl radicals, such as benzyl and 2-phenylethyl. Preferable monovalent halohydrocarbon radicals have the formula $C_nF_{2n+1}CH_2CH_2$— wherein n has a value of from 1 to 10, such as, for example, $CF_3CH_2CH_2$—, $C_4F_9CH_2CH_2$—, $C_6F_{13}CH_2CH_2$—, $C_2F_5$—O($CF_2$—$CF_2$—O)$_{1-10}CF_2$—, F[CF($CF_3$)—$CF_2$—O]$_{1-5}$—($CF_2$)$_{0-2}$—, $C_3F_7$—OCF($CF_3$)— and $C_3F_7$—OCF($CF_3$)—$CF_2$—OCF($CF_3$)—.

Preferred groups for R are methyl, phenyl, 3,3,3-trifluoropropyl, particular preferred is methyl.

$R^1$ is selected from aliphatic unsaturated groups, comprising C=C-group-containing groups (alkenyl groups), e.g.: n-, iso-, tertiary or cyclic alkenyl, $C_6$-$C_{30}$-cycloalkenyl, $C_8$-$C_{30}$-alkenylaryl, cycloalkenylalkyl, vinyl, allyl, methallyl, 3-butenyl, 5-hexenyl, 7-octenyl, ethyliden-norbornyl, styryl, vinylphenylethyl, norbornenyl-ethyl, limonenyl, optionally substituted by one or more O- or F-atoms, or C≡C-group-containing groups (alkinyl groups), optionally comprising one or more O- or F-atoms.

The alkenyl radicals are preferable attached to terminal silicon atoms, the olefin function is at the end of the alkenyl group of the higher alkenyl radicals, because of the more ready availability of the alpha-, omega-dienes used to prepare the alkenylsiloxanes.

Preferred groups for $R^1$ are vinyl, 5-hexenyl, cyclohexenyl, limonyl, styryl, vinylphenylethyl. Most preferred group $R^1$ is a vinyl.

Z includes for example divalent aliphatic or aromatic n-, iso-, tertiary- or cyclo-alkylene with up to 14 carbon atoms, arylene or alkylenearyl groups. Z forms bridging elements between two siloxy units. The content of the Z groups does not exceed 30 mol. % preferably not exceed 20 mol. % of all siloxy units. Preferably Z is absent. Preferred examples of suitable divalent hydrocarbon groups Z include any alkylene residue, preferably such as —$CH_2$—, —$CH_2CH_2$—, —$CH_2(CH_3)CH$—, —($CH_2$)$_4$—, —$CH_2CH(CH_3)CH_2$—, —($CH_2$)$_6$—, —($CH_2$)$_8$— and —($CH_2$)$_{18}$—; cycloalkylene radical, such as cyclohexylene; arylene radicals, such as phenylene, xylene and combinations of hydrocarbon radicals, such as benzylene, i.e. —$CH_2CH_2$—$C_6H_4$—$CH_2CH_2$—, —$C_6H_4CH_2$—. Preferred groups are alpha, omega-ethylene, alpha, omega-hexylene or 1,4-phenylene.

Further examples include divalent halohydrocarbon radicals Z e.g. any divalent hydrocarbon group Z wherein one or more hydrogen atoms have been replaced by halogen, such as fluorine, chlorine or bromine. Preferable divalent halohydrocarbon residues have the formula —$CH_2CH_2$($CF_2$)$_{1-10}CH_2CH_2$— such as for example, —$CH_2CH_2CF_2CF_2CH_2CH_2$— or other examples of suitable divalent hydrocarbon ether radicals and halohydrocarbon ether radicals including —$CH_2CH_2OCH_2CH_2$—, —$C_6H_4$—O—$C_6H_4$—, —$CH_2CH_2CF_2OCF_2CH_2CH_2$—, and —$CH_2CH_2OCH_2CH_2CH_2$—.

Such polymers as component (A) containing R, $R^1$ and/or Z radicals preferably are e.g. alkenyl-dimethylsiloxy or trimethylsiloxy terminated polydimethylsiloxanes, which can contain other siloxane units in the chain, like for example alkenylmethylsiloxy groups, diphenylsiloxy groups. forming e.g. poly(dimethyl-co-diphenyl)siloxane chains that are terminated with dimethylsiloxy or trimethylsiloxy groups.

Broadly stated component (A) of the compositions of this invention can be any polyorganosiloxane compound containing two or more silicon atoms linked by oxygen and/or divalent groups Z wherein the silicon is bonded to 0 to 3 monovalent groups per silicon atom, with the proviso that the polyorganosiloxane compound contains at least two silicon-bonded unsaturated hydrocarbon residues.

The siloxane units with radicals R and/or $R^1$ can be equal or different for each silicon atom. In a preferred embodiment the structure is

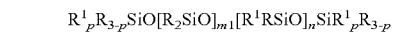

p=0-3, preferably 1, m1=10-2000, preferably 100-1000, n=0-500 preferably 0-200.

One preferred polyorganosiloxane component (A) for the composition of this invention is a substantially linear polyorganosiloxane (A1). The expression "substantially linear" includes polyorganosiloxanes (A1) that contain not more than 0.2 mol. % (trace amounts) of siloxy units of the type T or Q. This means the polymer (A) is preferably a linear, preferably flowable fluid (A1):

 (1a)

wherein $R^1$, R, p and m1 are as defined above, with the proviso, that there are at least two alkenyl groups per molecule. Preferred structures include

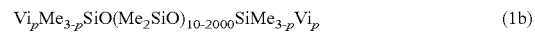 (1b)

 (1c),

In the group of alkenyl comprising siloxanes (A) the addition of a second or third siloxane as component (A2) and/or (A3) is preferred. The purpose of component (A2) and (A3) so-called vinyl rich polymers is to modify mechanical properties and crosslinking density.

The polymers (A2) are selected either from the group consisting of polymers of the formulas (1d) to (1i), i.e. linear polyorganosiloxanes having additional alkenyl side groups wherein the concentration of T- and Q-groups are below 0.2 mol. % or polyorganosiloxanes having a higher concentration of T- and Q-groups than the previous polymer types (A1) or (A2).

The polymers (A2) are represented by the formulas (6)

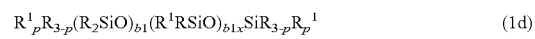 (1d)

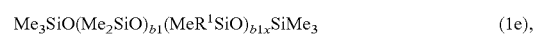 (1e),

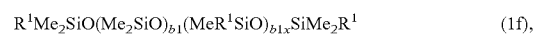 (1f), whereby b1=>0-2000 b1x=>0-500 b1+b1x=>10-100

$R^1$, R, p are as defined above, $R^1$=preferably vinyl, hexenyl, cyclohexenyl, limonyl, styryl, vinylphenylethyl. Most preferred $R^1$ is vinyl. Preferred groups for R are methyl, phenyl, 3,3,3-trifluoropropyl, most preferred is methyl.

The preferred value of b1x is less than 0.5*b1, preferably 0.0001*b1 to 0.25*b1 more preferably 0.0015*b1 to 0.2*b1.

Further preferred structures of (A2) are

$Vi_pMe_{3-p}SiO(Me_2SiO)_{10-2000}(MeViSiO)_{1-1000}SiMe_{3-p}Vi_p$ (1g),

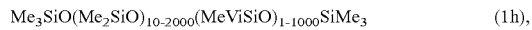

$Me_3SiO(Me_2SiO)_{10-2000}(MeViSiO)_{1-1000}SiMe_3$ (1h),

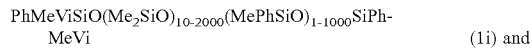

$PhMeViSiO(Me_2SiO)_{10-2000}(MePhSiO)_{1-1000}SiPhMeVi$ (1i) and wherein Me=methyl, Vi=vinyl, Ph=phenyl, and p=0 to 3, preferred p=1.

In a preferred embodiment component (A) is a mixture of component (A1) and (A2), more preferred mixture of:

$R^1_pR_{3-p}SiO(R_2SiO)_{m1}SiR_{3-p}R^1_p$ (1a)

and

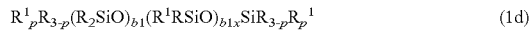

$R^1_pR_{3-p}(R_2SiO)_{b1}(R^1RSiO)_{b1x}SiR_{3-p}R^1_p$ (1d)

wherein R, $R^1$, p, q, m1, b1 and b1x are as defined above, and R is preferably methyl and $R^1$ is preferably vinyl.

The third preferably optionally used component of polymer (A), includes branched polymers (A3), which are preferably selected from those of the formula (4a) wherein the polyorganosiloxane (A3) comprising alkenyl groups have more than 0.2 mol. % of T=$RSiO_{3/2}$ or Q=$SiO_{4/2}$-units.

$[M_{0.4-4}D_{0-1000}T_{0-50}Q_{0-10}]_{1-1000}$ (4a)

whereby

M=$R_3SiO_{1/2}$, or M*

D=$R_2SiO_{2/2}$, or D*

T=$RSiO_{3/2}$, or T*

Q=$SiO_{4/2}$, wherein M*, D* and T* are as defined above, carrying unsaturated groups $R^1$. The amount of such M*, D* and T* units is preferably 0.001 to 20 mol. %, more preferably 0.01 to 15 mol. %, most preferably 0.1 to 10 mol. % based on all siloxy units.

A preferred branched polymer (A3) includes silicone resins comprising at least one branching unit (T=$RSiO_{3/2}$, or T*, Q=$SiO_{4/2}$), which are favorable inter alia to impart strength to the composition such as tensile strength and concurrently to increase the hardness thereof. More illustratively, the silicone resin contain M=$R_3SiO_{1/2}$, or M*, and at least one unit selected from T=$RSiO_{3/2}$, T* and Q=$SiO_{4/2}$, and optionally contains D units selected from D=$R_2SiO_{2/2}$, or D*.

The molar ratio of M unit to T and Q units if combined preferably is:

M/(Q+T)=0.6 to 1.2, preferably 0.7 to 1.1.

The silicone resin may be synthesized, for example, by hydrolyzing the suitable alkoxysilanes or chlorosilanes in such a ratio as to meet the above-mentioned composition.

A preferred embodiment of the addition-curable silicone rubber composition comprises at least one polyorganosiloxane selected from (A1) and (A2), and at least one polyorganosiloxane selected from (A3).

The range of the subindices defines a range of the possible average polymerization degrees $P_n$ according to the number average molecular weight $M_n$.

The indices correspond to suitable viscosities as defined later on and describe polymers without any solvent for a viscosity adjustment.

The preferred branched polyorganosiloxanes (A2) and (A3) have usually a higher concentration of unsaturated groups $R^1$. Branched polymers (A3) are described e.g. in U.S. Pat. No. 5,109,095. Preferably the branched vinyl-rich polymers (A3) have a range of D:T>10:1 preferably >33:1 and/or respectively (M:Q)=0.6-4:1, such as e.g. $[M_{0.7}M^*_{0.05}Q]_{10-500}$ (1j).

All these polymers can be prepared by any of the conventional methods for preparing triorganosiloxane-terminated polydiorganosiloxanes. For example, a proper ratio of the appropriate hydrolyzable silanes, e.g., vinyldimethylchlorosilane, trimethylchlorsilane, tetrachlorosilane, methyltrichlorsilane and dimethyl-dichlorosilane, or its corresponding alkoxysilanes, can be co-hydrolyzed and condensed. Other reaction routes may run alternately over equilibration reactions of 1,3-divinyltetraorganodisiloxane, e.g. symmetrical divinyldimethyldiphenylsiloxane or divinyltetramethyldisiloxane, which furnishes the endgroups of the polydiorganosiloxane, which may be equilibrated with an appropriate polydiorganosiloxane, e.g., octamethylcyclotetrasiloxane, in the presence of an acidic or basic catalyst.

In a preferred embodiment the polymer component (A) is a mixture of polymers of the formula (1a) and/or of the formula (1d) and/or (1j) whereby the mixture has an alkenyl content in average of preferably below 2 mol. % of all siloxy units of the mixture (A), whereby polymer (A1) is present in a higher amount than (A2) or (A3).

The viscosities of the polydiorganosiloxanes (A) defined above for the purposes of this invention, preferably refer to the polyorganosiloxanes essentially free of cyclic polydiorganosiloxanes (less than 1 wt. %, preferably 0.5 wt. % measured for 1 h 150° C. 20 mbar).

The average polymerization degree $P_n$ of the siloxane units (M, D, T, Q) of the polymer (A) measured by GPC measurement versus polystyrene standard based on the average number mol weight $M_n$ is preferably in the range of $P_n$>10 to 2000, the more preferred range is 40 to 1000. The viscosities of such polymers are preferably in the range of 10 to 100,000 mPa·s at 25° C. at a shear rate of D=10 $s^{-1}$, more preferred 40 to 70,000 mPa·s.

Preferably the alkenyl content of the component (A) is in the range of 0.001 to 20 mol %, especially 0.01 to 10 mol % based on the entire organic groups attached to silicon atoms.

The alkenyl content of the components (A) can be determined here by way of $^1$H NMR—see A. L. Smith (ed.): The Analytical Chemistry of Silicones, J. Wiley & Sons 1991 Vol. 112 pp. 356 et seq. in Chemical Analysis ed. by J. D. Winefordner.

Component (B)—Crosslinker

Suitable polyorganohydrogensiloxanes (B) comprising SiH units can be described by the general formula (2),

$[M^1_{a2}D^1_{b2}T^1_{c2}Q_{d2}Z_{e2}]_{m2}$ (2)

wherein the siloxy units $M^1$=M, as defined above, or M, $D^1$=D, as defined above, or D, $T^1$=T, as defined above, or T, Q as defined above, Z as defined above, M=$HR_2SiO_{1/2}$, D=$HRSiO_{2/2}$, T=$HSiO_{3/2}$, a2=0.01-10 preferably =2-5, most preferably =2,
b2=0-1000 preferably =10-500
c2=0-50 preferably =0
d2=0-5 preferably =0
e2=0-3 preferably =0
m2=1-1000, preferably =1-500, most preferably =1,
with the proviso that there are at least two groups selected from M, D and T**.

Preferably the component (B) is selected from polysiloxanes that have only methyl or phenyl groups, even more preferably only methyl groups as organic residues.

Preferably the polyorganohydrogensiloxanes (B) have at least 10, preferably at least 15, more preferably at least 20, still more preferably at least 25 and most preferably at least 30 silicon atoms.

The siloxy units can be distributed blockwise or randomly in the polymer chain.

The aforementioned indices should represent the average polymerization degree $P_n$ based on the average number molecular mass $M_n$.

The range for M-, D-, T- and Q-units present in the molecule can cover nearly all values representing fluids, flowable polymers, liquid and solid resins. It is preferred to use liquid linear, cyclic or branched siloxanes. Optionally these siloxanes can comprise additionally traces of $C_1$-$C_6$-alkoxy or Si-hydroxy groups remaining from the synthesis.

Preferred structures of component (B) in the compositions of this invention are siloxanes of formula (2a) to (2e).

$$H_{a1}(R)_{3-a1}Si[RHSiO]_x[R_2SiO]_y[RR^1SiO]_z Si(R)_{3-a1}H_{a1} \quad (2a)$$

more specifically:

$$HR_2SiO(R_2SiO)_y(RR^1SiO)_z(RHSiO)_xSiR_2H \quad (2b)$$

$$HMe_2SiO(Me_2SiO)_y(RR^1SiO)_z(MeHSiO)_xSiMe_2H \quad (2c)$$

$$Me_3SiO(MeHSiO)_xSiMe_3 \quad (2d)$$

$$Me_3SiO(Me_2SiO)_y(RR^1SiO)_z(MeHSiO)_xSiMe_3 \quad (2e)$$

wherein R and $R^1$ are as defined above, R is preferably methyl and/or phenyl, $R^1$ is preferably vinyl, and index 'a1' is 0-1, preferably 0, and preferably
x=2-1000, preferably =2-500,
y=0-650, preferably =0-100,
z=0-65, preferably =0
2≤x+y+z<1000, preferably 10≤x+y+z<650.
Most preferred is $$Me_3SiO(Me_2SiO)_y(RR^1SiO)_z(MeHSiO)_xSiMe_3 \quad (2e)$$

with x, y, z as defined before, i.e. z is preferably 0.

Furthermore the use of resinous polyorganohydrogensiloxanes of the following formula are possible:

$$\{[T^1][R^{29}O_{1/2}]_{n2}\}_{m2} \quad (2f)$$

$$\{[SiO_{4/2}][R^{29}O_{1/2}]_{n2}[M^1]_{0.01-10}[T^1]_{0-50}[D^1]_{0-1000}\}_{m2} \quad (2g)$$

wherein
$T^1$, $M^1$, $D^1$ are as defined above,
n2=0 to 3
m2 is as defined above
$R^{29}$ is hydrogen, $C_1$-$C_{25}$-alkyl, such as methyl, ethyl, n-propyl, iso-propyl, n-, iso- and tert.-butyl, alkanoyl, such acyl, aryl, —N=CHR, such as butanonoxime, alkenyl, such as propenyl,
wherein in each formula (2e)-(2f) the molar ratio of SiH-groups to all Si-atoms is preferably more than 0.01 and preferably up to 0.7, and the total number of Si atoms is preferably at least 7, more preferably at least 15 and even more preferably at least 20.

One preferred embodiment of the compounds (2f) is provided by way of example by monomeric to polymeric compounds which can be described via the formula $[(Me_2HSiO_{0.5})_kSiO_{4/2}]_{1.5-1000}$ wherein index k is from 0.3 to 4. Such liquid or resinous molecules can contain significant concentrations of SiOH— and/or ($C_1$-$C_6$)-alkoxy-Si groups of up to 10 mol. % related to the silicon atoms.

Specific examples of preferred suitable compounds for component (B) in the compositions of this invention include
$Me_3SiO$-$(MeHSiO)_{2-50}$—$SiMe_3$,
$Me_3SiO$-$(MeHSiO)_{2-50}(Me_2SiO)_{1-100}SiMe_3$,
$(MeHSiO)_7$,
$HMe_2SiO$-$(MeHSiO)_{0-60}(Me_2SiO)_{1-250}SiMe_2H$
$HMe_2SiO(Me_2SiO)_{0-30}(MePhSiO)_{0-30}$
$(MeHSiO)_{2-50}SiMe_2H$,
$Me_3SiO(Me_2SiO)_{0-30}(MePhSiO)_{0-30}$
$(MeHSiO)_{2-50}SiMe_3$,
$Me_3SiO(Me_2SiO)_{0-30}(Ph_2SiO)_{0-30}(MeHSiO)_{2-50}SiMe_3$,
wherein in each formula the molar ratio of SiH-groups to all Si-atoms is preferably more than 0.01 and the total number of Si atoms is preferably at least 7, more preferably have at least 10, more preferably at least 15, most preferably at least 20 atoms.

Most preferred are compounds of the formula $Me_3SiO$-$(MeHSiO)_{2-50}(Me_2SiO)_{0-100}SiMe_3$, with an SiH-content of at least 0.2 mmol/g, preferably at least 1.5 mmol/g, still more preferably 2 mmol/g.

The component (B) can be used as a single component of one polyorganohydrogensiloxane polymer or mixtures thereof.

If an increase of the cure rate is required, it is preferred to use some organopolysiloxanes (B) having $HMe_2SiO_{0.5}$-units or homo MeHSiO-polymers to adjust the cure rate to shorter times.

If it is necessary to still further increase the cure rate, this can be achieved by way of example via an increase of the molar ratio of SiH to Si-alkenyl, or an increased amount of catalyst (C).

The component (B) has preferably a viscosity at 25° C. from 2 to 2000 mPa·s, preferably from 2 to 1000 mPa·s, still more preferably 5 to 100 mPa·s (preferably measured at a shear rate of D=10 s$^{-1}$).

Preferably the crosslinker (B) should have at least more than 2, more preferably more than 3, in some instances also more than 15 and more than 20 SiH-groups per molecule.

Component (B) is a compound different from component (D).

Component (C)—Catalyst

The inventive composition contains at least one hydrosilylation catalyst as component (C) selected from the group of organo metal compounds, salts or metals, having the ability to catalyze hydrosilylation wherein the metal is selected from the group of Ni, Ir, Rh, Ru, Os, Pd and Pt compounds as taught in U.S. Pat. Nos. 3,159,601; 3,159,662; 3,419,593; 3,715,334; 3,775,452 and 3,814,730. Most preferred are platinum compounds.

The component (C) for the hydrosilylation reaction of the inventive composition is a catalyst compound, which facilitates the reaction of the silicon-bonded hydrogen atoms of component (B) with the silicon-bonded olefinic hydrocarbon substituents of component (A). The metal or organo metal compound is generally based on a platinum group metal. Without wishing to be bound by theory, it is believed that the catalyst (C) includes complexes with sigma- and pi-bonded carbon ligands as well as ligands with S-, N, or P atoms, metal colloids or salts of the afore mentioned metals. The catalyst can be present on a carrier such as silica gel or powdered charcoal, bearing the metal, or a compound or complex of that metal. Preferably, the metal of component (C) is any platinum complex compound.

A typical platinum containing catalyst component in the polyorganosiloxane compositions of this invention is any form of platinum (0), (II) or (IV) compounds which are able to form complexes. Preferred complexes are Pt-$^{(0)}$-alkenyl complexes, such alkenyl, cycloalkenyl, alkenylsiloxane such vinylsiloxane, because of its easy dispersibility in polyorganosiloxane compositons.

A particularly useful form of the platinum complexes are the Pt$^{(0)}$-complexes with aliphatically unsaturated organosilicon compound such as a 1,3-divinyltetramethyldisiloxane (Vinyl-M2 or Karstedt catalyst:

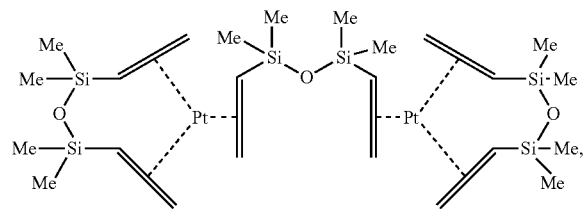

as disclosed by e.g. U.S. Pat. No. 3,419,593 incorporated herein by reference are especially preferred, cyclohexene-Pt, cyclooctadiene-Pt and tetravinyltetramethyl-tetracyclosiloxane (Vinyl-D4)-Pt, e.g. Ashby's catalyst, a Pt(0) complex in tetramethyltetravinylcyclotetrasiloxane with the empirical formula $Pt[(C_3H_6SiO)_4]_x$.

Also preferably is a so-called Lamoreaux catalyst, which is a platinum (II) complex compound, obtained from chloroplatinic acid hexahydrate and octyl alcohol (as described for example in U.S. Pat. No. 3,197,432 or 3,220,972). Preferably are Pt(O) or Pt(II) catalysts, with preference to Ashby and Lamoreaux platinum catalysts.

The amount of platinum-containing catalyst component that is used in the compositions of this invention is not narrowly limited as long as there is a sufficient amount to accelerate the hydrosilylation between (A) and (B) at the desired temperature in the required time (B) in the presence of all other ingredients of the inventive composition. The exact necessary amount of said catalyst component will depend upon the particular catalyst, the amount of other inhibiting compounds and the SiH to olefin ratio and is not easily predictable. However, for platinum catalysts said amount can be as low as possible due to cost reasons. Preferably one should add more than one part by weight of platinum for every one million parts by weight of the organosilicon components (A) and (B) to ensure curing in the presence of other undefined inhibiting traces. For the compositions of this invention the amount of platinum containing catalyst component to be applied is preferably sufficient to provide from 1 to 200 ppm preferably 2 to 100 ppm, especially preferred 4 to 60 ppm by weight platinum per weight of polyorganosiloxane components (A) plus (B). Preferably said amount is at least 4 ppm platinum by weight per sum of (A) and (B).

The hydrosilylation catalyst can also be selected from the group of catalysts capable of being photoactivated. These photo-activatable catalysts preferably contain at least one metal selected from the group composed of Pt, Pd, Rh, Co, Ni, Ir or Ru. The catalysts capable of being photoactivated preferably comprise platinum compounds. Catalyst capable of being photo-activatable is preferably selected among organometallic compounds, i.e. comprise carbon-containing ligands, or salts thereof. In a preferred embodiment photoactive catalyst (C) has metal carbon bonds, including sigma- and pi-bonds. Preferably the catalyst capable of being photoactivated (C) is an organometallic complex compound having at least one metal carbon sigma bond, still more preferably a platinum complex compound having preferably one or more sigma-bonded alkyl and/or aryl group, preferably alkyl group(s). Sigma-bonded ligands include in particular, sigma-bonded organic groups, preferably sigma-bonded $C_1$-$C_6$-alkyl, more preferably sigma-bonded methyl groups, sigma-bonded aryl groups, like phenyl, Si and O substituted sigma bonded alkyl or aryl groups, such as trisorganosilylalkyl groups, sigma-bonded silyl groups, like trialkyl silyl groups. Most preferred photo-activatable catalysts include $\eta^5$-(optionally substituted)-cyclopentadienyl platinum complex compounds having sigma-bonded ligands, preferably sigma-bonded alkyl ligands.

Further catalysts capable of being photoactivated include ($\eta$-diolefin)-(sigma-aryl)-platinum complexes (see e.g. U.S. Pat. No. 4,530,879).

The catalyst capable of being photoactivated can be used as such or supported on a carrier.

Examples of catalysts capable of being photo-activated include $\eta$-diolefin-$\sigma$-aryl-platinum complexes, such as disclosed in U.S. Pat. No. 4,530,879, EP 122008, EP 146307 (corresponding to U.S. Pat. No. 4,510,094 and the prior art documents cited therein), or US 2003/0199603, and also platinum compounds whose reactivity can be controlled by way for example using azodicarboxylic esters, as disclosed in U.S. Pat. No. 4,640,939 or diketonates.

Platinum compounds capable of being photo-activated that can be used are moreover those selected from the group having ligands selected from diketones, e.g. benzoylacetones or acetylenedicarboxylic esters, and platinum catalysts embedded into photo-degradable organic resins. Other Pt-catalysts are mentioned by way of example in U.S. Pat. No. 3,715,334 or 3,419,593, EP 1 672 031 A1 and Lewis, Colborn, Grade, Bryant, Sumpter, and Scott in *Organometallics*, 1995, 14, 2202-2213, all incorporated by reference here.

Catalysts capable of being photo-activated can also be formed in-situ in the silicone composition to be shaped, by using Pt$^0$-olefin complexes and adding appropriate photoactivatable ligands thereto.

The catalysts capable of being photo-activated that can be used here are, however, not restricted to these abovementioned examples.

The most preferred catalyst capable of being photoactivated to be used in the process of the invention are ($\eta^5$-cyclopentadienyl)-trimethyl-platinum, ($\eta^5$-cyclopentadienyl)-triphenyl-platinum complexes, in particular, ($\eta^5$-methylcyclopentadienyl)-trimethyl-platinum.

The amount of the catalyst capable of being photo-activatable is preferably 1 to 500 ppm and preferably in the same lower range as defined for the heat-activatable hydrosilylation catalysts mentioned above.

Component (D)—Organosilicon Compound (OSC)

Component D) is at least one organosilicon compound containing at least one polyvalent aromatic group, which is not directly attached to a silicon atom, and at least one Si—H group. The term "which is not directly attached to a silicon atom" is intended to mean that there is no bond of a Si atom to a carbon atom being part of a polyvalent aromatic group, in particular, there is no Si-phenylene-Si group.

Component (D) is different from compound B). Component (D) acts in particular as an adhesion promotor and may also serve as a crosslinking agent.

Component (D) is an organosilicon compound such as an organosilane or organopolysiloxane having at least one SiH group (a hydrogen atom bonded to a silicon atom) and at least one polyvalent aromatic group which is not directly attached to a silicon atom per molecule, and typically having 1 to 60 silicon atoms per molecule. In the present invention, the term polyvalent aromatic group includes in particular divalent to tetravalent aromatic structures, such as a phenylene structure, naphthalene structure, and anthracene structure. Component (D) is preferably an organosilicon compound comprising one or more straight-chain or cyclic optionally substituted organosiloxane moieties containing 1 to 30, preferably 2 to 20, and most preferably 3 to 10 silicon atoms. These organosiloxane moieties further contain at least one, preferably 1 to 20, and most preferably 2 to 10 SiH groups, and at least one, preferably 1 to 4 polyvalent aromatic groups per molecule. Furthermore these organosiloxane moieties optionally contain one or more additional functional groups such as, an alkoxy group, an epoxy group such as glycidoxy group, an alkoxysilyl group such as trimethoxysilyl group, triethoxysilyl group, and methyldimethoxysilyl group, an ester group, an acryl group, a methacryl group, a carboxy group, a carboxy anhydride group, isocyanate group, amino group, or amide group. Specific examples of such compounds include:

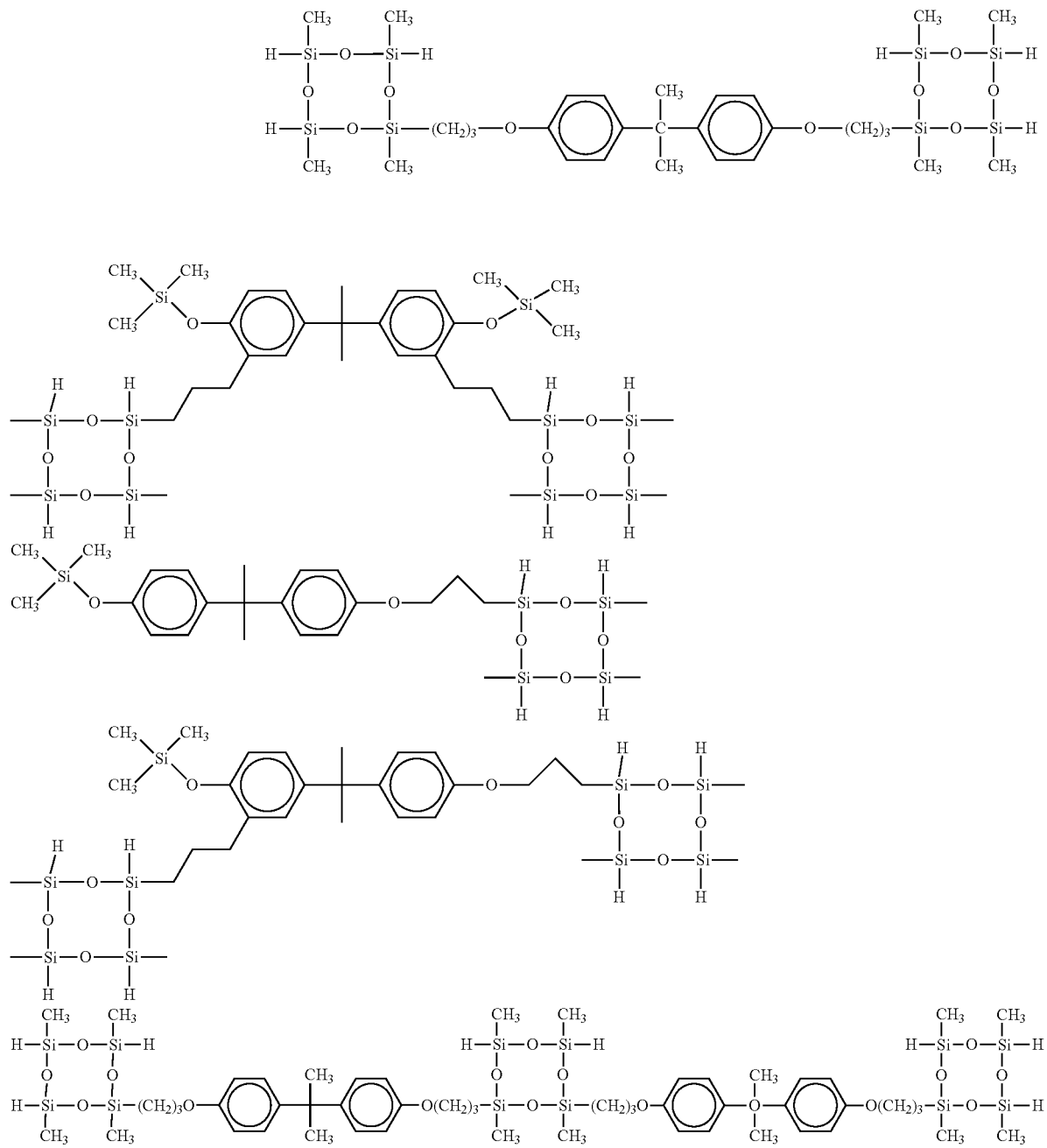

-continued

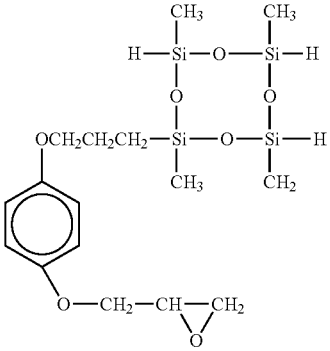

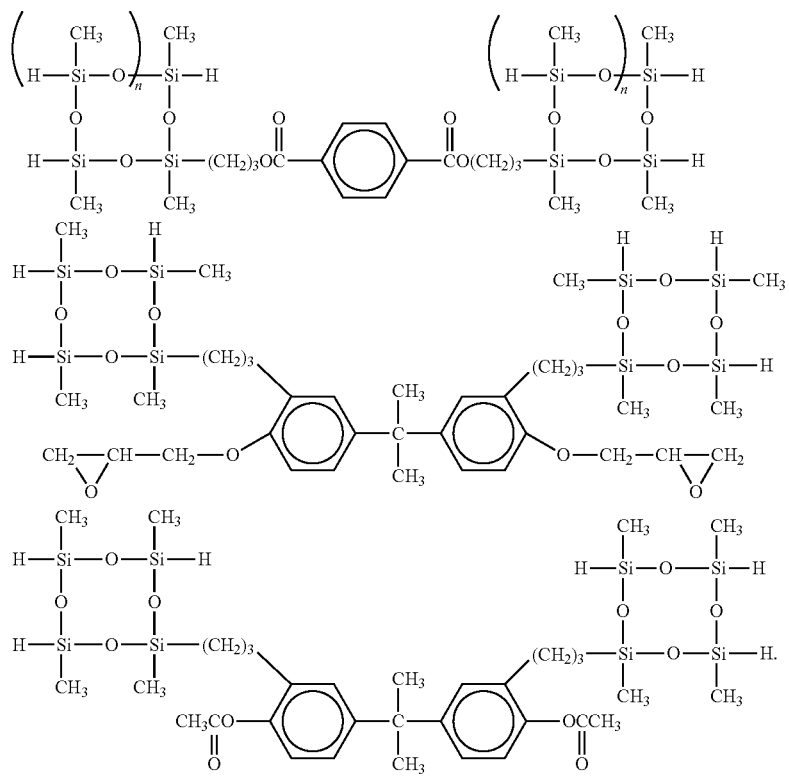

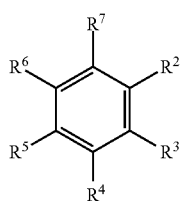

Component (E)—Aromatic Compound with at Least Two Unsaturated Hydrocarbyl Residues The at least one aromatic compound (E) is an aromatic compound that has at least two, preferably two, three or four, more preferably two unsaturated hydrocarbyl groups, preferably allyl groups. The aromatic compound (E) does not contain a siloxane group, that is, it does not comprise a Si—O—Si moiety. Further the aromatic compound (E) also does not contain an ester group (—C(═O)—O— or —O—C(═O)—), which is supposed to have positive influence on the mold fouling properties of the addition-curable silicone rubber composition of the invention. The unsaturated hydrocarbyl group is in particular an unsaturated aliphatic group having preferably up to 20 carbon atoms, preferably up to 6 carbon atoms, and optionally one or more heteroatoms. Most preferably the unsaturated hydrocarbyl group comprises an allyl group, which for example can be attached to the aromatic group via a carbon atom, or an oxygen atom (—O—). The aromatic compound E) comprises at least one aromatic group, preferably having 6 to 10 carbon atoms, most preferably at least one or two phenyl moieties (which may be linked by a linker group or which may be also present as a biphenyl group). The aromatic group(s) in the aromatic compound (E) optionally may have additional, preferably 1 or 2 substituents apart from the unsaturated hydrocarbyl group. Such additional substituents may be selected for example from hydroxyl, halogen, C1-C6-alkyl, C1-C6-alkoxy, and tri(C1-C6-hydrocarbyl)siloxy.

Component (E) is an aromatic compound with preferably up to 30 carbon atoms, that comprises at least one aromatic, preferably a carbocyclic aromatic group with 6 to 14 carbon atoms and having at least 2 (e.g. 2, 3 or 4, preferably 2) unsaturated, preferably aliphatic (i.e. non-aromatic) hydrocarbyl residues. Most preferably the unsaturated preferably aliphatic hydrocarbyl residues comprises at least 2, preferably 2 allyl groups, and optionally other unsaturated preferably aliphatic hydrocarbyl residues like in particular vinyl groups (i.e. not bonded to —CH$_2$—).

Preferably such compounds are selected from the group consisting of an aromatic compound of the formula (3):

(3)

wherein $R^2$ to $R^7$ are the same or different from each other and are selected from the group consisting of hydrogen, hydroxy, halogen, —$R^8$, wherein $R^8$ is a saturated or unsaturated, optionally substituted hydrocarbyl group with up to 20 carbon atoms preferably up to 6 carbon atoms, —O—$R^9$, wherein R⁹ is a saturated or unsaturated optionally substituted hydrocarbyl group with up to 20 carbon atoms, preferably up to 6 carbon atoms, with the proviso that the compound of formula (3) comprises at least two unsaturated, in particular aliphatic, hydrocarbyl groups, preferably at least two allyl groups:

wherein ----- denotes a single bond, and wherein the unsaturated hydrocarbyl group might be bond in particular via an oxygen atom to the aromatic group. In a preferred embodiment the compound of formula (3) has two allyloxy groups.

Furthermore compound (E) include an aromatic compound of the formula (4):

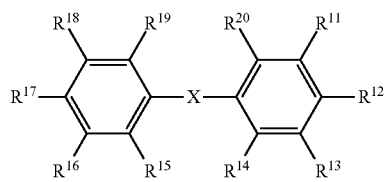

(4)

wherein R¹ to R²⁰ are the same or different from each other and are selected from the group consisting of hydrogen, hydroxy, halogen, —R²¹, wherein R²¹ is a saturated or unsaturated optionally substituted hydrocarbyl group with up to 20 carbon atoms, preferably up to 6 carbon atoms, —O—R²², wherein R²² is a saturated or unsaturated optionally substituted hydrocarbyl group with up to 20 carbon atoms, preferably up to 6 carbon atoms, and a silyloxy group of the formula —OSiR²⁴R²⁵R²⁶, wherein R²⁴, R²⁵, and R²⁶ are independent from each other selected from optionally substituted hydrocarbyl group with up to 20 carbon atoms, X is selected from the group consisting of the groups:
single bond,
—R²⁷—, wherein R²⁷ is a divalent linear or cyclic saturated optionally substituted hydrocarbyl group with up to 20 carbon atoms,
—C(O)—,
—S(O)₂—,
—S(O)—,
—S—
—O—Si(R²⁸)₂—O—, wherein R²⁸ is independently selected from the group of a halogen, and a saturated or unsaturated hydrocarbyl group with up to 6 carbon atoms, and
—O— with the proviso that the compound of formula (4) comprises at least two unsaturated hydrocarbyl groups, preferably at least two, more preferably two allyl groups, and optionally one or more vinyl-groups.

The unsaturated hydrocarbyl groups might be bonded to the aromatic moiety via an oxygen atom.

Preferred aromatic compounds of formula (4) include for example:

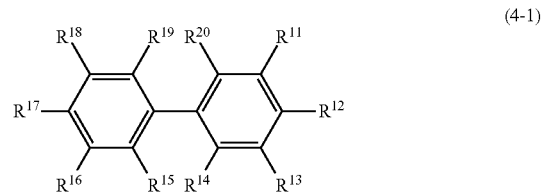

(4-1)

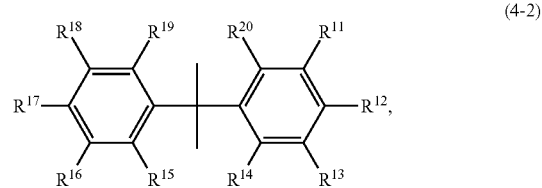

(4-2)

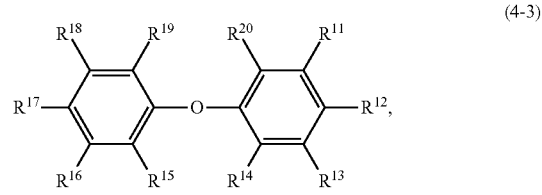

(4-3)

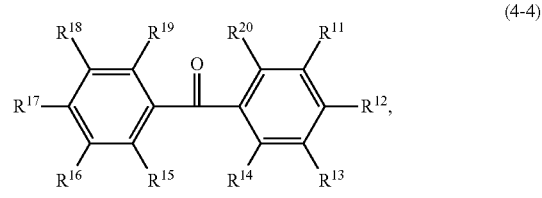

(4-4)

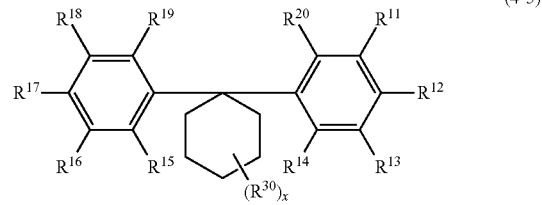

(4-5)

wherein R¹¹ to R²⁰ are each as defined above, and preferably include hydrogen, hydroxyl, allyl, allyloxy, trialkylsiloxy, such as trimethylsiloxy, and R³⁰ is a C1-C4 alkyl substituent group at the cyclohexyl group, which is preferably methyl, and x is 0 (no R³⁰ group present) to 3. Two groups R³⁰ can be at the same carbon atom. Preferred compounds of formula 4-5 include:

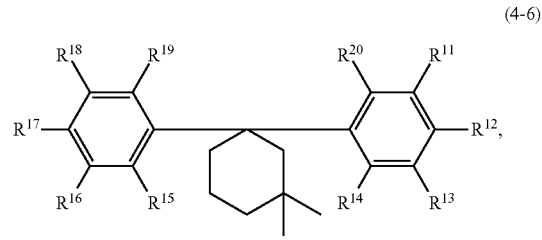

(4-6)

-continued (4-7)

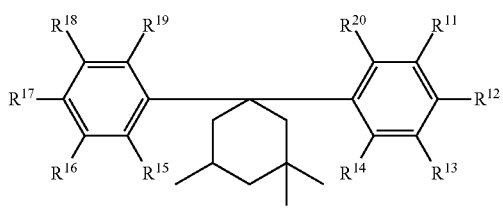

Examples of the compound (E) include for example the compounds of the formula:

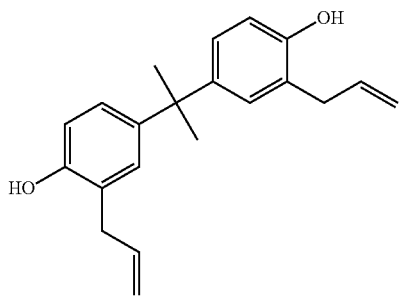 [SMILES: C=CCc1cc(C(C)(C)c2ccc(O)c(CC=C)c2)ccc1O]

(2-allyl-4-[1-(3-allyl-4-hydroxy-phenyl)-1-methyl-ethyl] phenol (2,2'-diallyl bisphenol A))

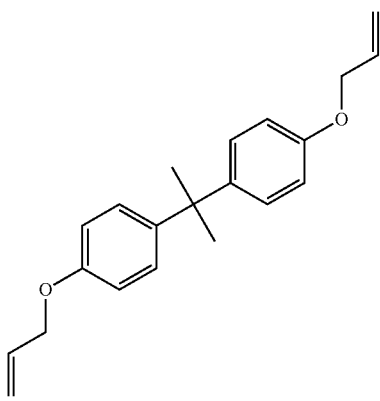 [SMILES: C=CCOc1ccc(C(C)(C)c2ccc(OCC=C)cc2)cc1]

(1-allyloxy-4-[1-(4-allyloxyphenyl)-1-methyl-ethyl]benzene (bisphenol A diallyl ether)))

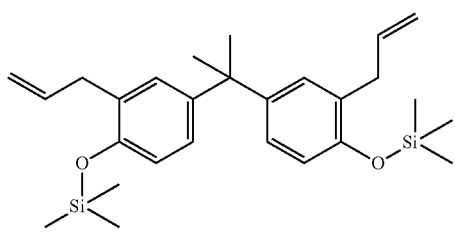 [SMILES: C=CCc1cc(C(C)(C)c2ccc(O[Si](C)(C)C)c(CC=C)c2)ccc1O[Si](C)(C)C]

([2-allyl-4-[1-(3-allyl-4-trimethylsilyloxy-phenyl)-1-methyl-ethyl]phenoxy]-trimethyl-silane)) and

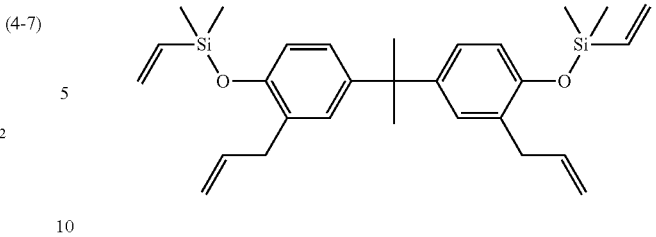

([2-allyl-4-[1-[3-allyl-4-[dimethyl(vinyl)silyl]oxy-phenyl]-1-methyl-ethyl]phenoxy]-dimethyl-vinyl-silane).

Component (F) Reinforcing Filler

The addition-curable polyorganosiloxane compositions optionally comprise one or more reinforcing fillers, if appropriate surface-modified, reinforcing fillers (F). Reinforcing fillers (F) are characterized in particular by a BET surface area of 50 m$^2$/g or more.

The fillers include by way of example all of the fine-particle fillers, i.e. those having particles smaller than 100 µm, i.e. preferably composed of such particles. These can be mineral fillers, such as silicates, carbonates, nitrides, oxides, or silicas. The fillers are preferably those known as reinforcing silicas, which also permit production of elastomers having sufficient transparency for irradiation. Preferred are reinforcing silicas, in particular those increasing the strength. Examples are silicas whose BET surface areas are from 50 to 400 m$^2$/g, preferably 80 to 350 m$^2$/g, in particular, fumed or precipitated silicas. Preferably these fillers are surface-hydrophobicized. If component (E) is used, its amounts are preferably from 1 to 100 parts by weight, more preferably from 0 to 70 parts by weight, even more preferably from 0 to 50 parts by weight, even more preferably from 5 to 45 parts by weight based on 100 parts by weight of component (A) and (B).

Fillers whose BET surface areas are above 50 m$^2$/g permit production of silicone elastomers with improved properties. In view of strength and transparency fumed silicas are preferred, and even more preferred silicas are, for example, Aerosil® 200, 300, HDK® N20 or T30, Cab-O-Sil® MS7 or HS5 having more than 200 m$^2$/g BET surface area. As BET surface area rises, the transparency of the silicone mixtures in which these materials are present also rises. Examples of trade names of the materials known as precipitated silicas, or wet silicas, are Vulkasil®VN3, or FK 160 from Evonik (formerly Degussa), or Nipsil®LP from Nippon Silica K.K. and others.

It is preferred to use silica fillers having BET-surface areas of 50 m$^2$/g or more, preferably having a BET-surface of at least 150 m$^2$/g. Such compositions can be also photo-activated if desired due to sufficient transparency.

The fillers (F) may be subject of any suitable conventional surface-treatment with suitable surface-treatment agents belonging to hydrophobizing treatment with a suitable hydrophobizing agent, dispersing treatment with suitable dispersing agents which influence the interaction of the filler with the silicone polymer, e.g. influence thickening action. The surface treatment of the fillers is preferably a hydrophobation with silanes or with siloxanes. It can by way of example take place in situ via addition of silazanes, such as hexamethyldisilazane and/or 1,3-divinyltetramethyldisilazane, with addition of water, and 'in-situ'-hydrophobation is preferred. It can also take place with other familiar filler-treatment agents with poly-organosiloxanediols whose chain lengths are from 2 to 50 and which bear unsaturated organic radicals, with the aim of providing reactive sites for the crosslinking reaction.

Examples of commercially available silicas pre-hydrophobized with various silanes are: Aerosil® R 972, R 974, R 976, or R 812, or, for example, HDK 2000 or H30 Examples of trade names for materials known as hydrophobized precipitated silicas or wet silicas are e.g. Sipernat D10 or D15 from Evonik (formerly Degussa).

Rheological properties, i.e. technical processing properties, of the non-cured silicone rubber mixtures can be influenced by the selection the amount of the type of the filler, its amount, and the nature of hydrophobization.

Component (G)—Auxiliary Additives

The addition-curable polyorganosiloxane composition according to the invention may also comprise conventional auxiliary additives.

Such auxiliary additives include for example further adhesion promotors, such as those described in WO 2011/107592:

(Compounds (D1)-(D3), e.g. that is, (D1): at least one organosiloxane, comprising at least one alkoxy silyl group, (D2): at least one organosilane, comprising at least one alkoxy silyl group, (D3): at least one aromatic organic compound having at least two aromatic moieties and at least one group reactive in hydrosilylation, which compounds shall be different from any of the components A) to F) of the composition of the invention. The preferred ones are included herein by reference to WO 2011/107592 (in the following the definition of the substituent groups refer to the definitions given in WO 2011/107592):

Component (D1) is preferably an polyorganosiloxane comprising at least one unit selected from the group consisting of $RHSiO_{2/2}$ and $R^5(R)SiO_{2/2}$, wherein R is as defined above and may be identical or different, $R^5$ is selected from the group consisting of unsaturated aliphatic group with up to 14 carbon atoms, epoxy-group-containing aliphatic group with up to 14 carbon atoms, cyanurate-containing group, and an isocyanurate-containing group, and further comprising at least one unit of the formula (3):

(3)

wherein

R is selected from optionally substituted alkyl with up to 30 carbon atoms, optionally substituted aryl with up to 30 carbon atoms, and may be identical or different, $R^3$ is selected from H (hydrogen) and alkyl radicals having 1 to 6 carbon atoms, and may be identical or different, $R^4$ is a difunctional optionally substituted hydrocarbyl radical with up to 15 carbon atoms, which may contain one or more heteroatoms selected from O, N and S atoms, and which is bond to the silicon atoms via an Si—C-bond, and d is 0 to 2.

Examples of component (D1) include compounds of the formulas (3a-3d):

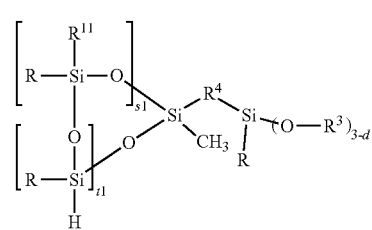

(3a)

$R^{11}$ is R or $R^5$, wherein R, $R^3$, $R^4$ and $R^5$ are as defined above and may be identical or different, s1=0-6, preferably 1 t1=0-6, preferably 1 or 2 s1+t1=2-6, preferably 2 or 3 with the proviso that there is at least one group —(OSi(R)H)— or —(OSi(R)($R^{11}$)— in the compound, preferably a compound of the formula:

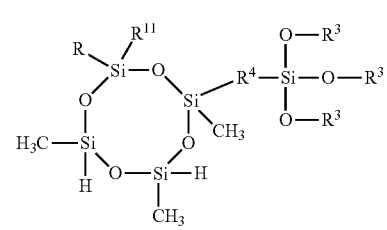

(3b)

wherein R, $R^3$, $R^4$ and $R^{11}$ are as defined before, and ring positions isomers thereof, a compound of the formula:

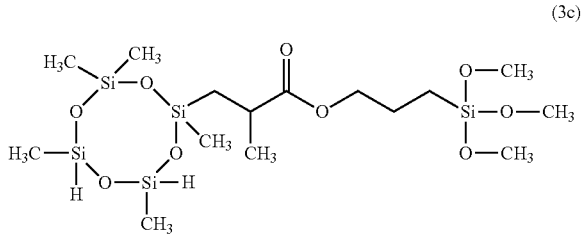

(3c)

and ring positions isomers thereof, a compound of the formula.

Furthermore compounds of formula:

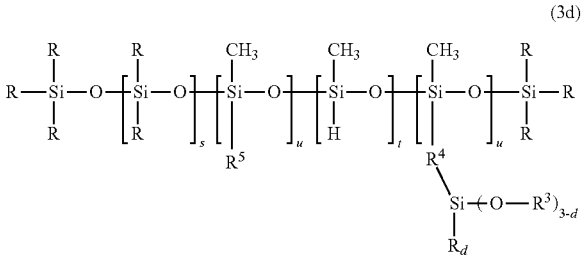

(3d)

wherein:

R, $R^3$, $R^4$, $R^5$ are as defined above, s=0-10 preferably =0-5 t=0-50 preferably =2-30 u=1-10 preferably =1 s+t+u=≤70 with the proviso that there is at least one group —(OSi(R)H)— or —(OSi(R)(R$^5$))— in the compound.

These compounds may comprise to a certain content Q or T branching groups, replacing the D units.

R$^5$ is for example selected from:

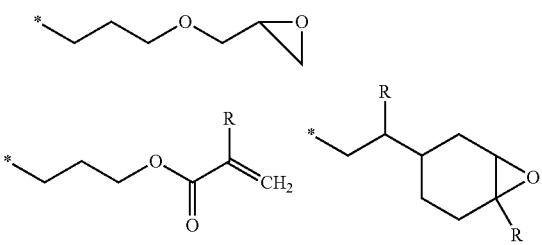

Component (D2) is preferably selected from compounds of the formula (4):

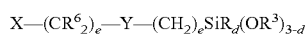

wherein

X is selected from the group consisting of halogen, pseudohalogen, unsaturated aliphatic group with up to 14 carbon atoms, epoxy-group-containing aliphatic group with up to 14 carbon atoms, cyanurate-containing group, and an isocyanurate-containing group, Y is selected from the group consisting of a single bond, a heteroatomic group selected from —COO—, —O—, —S—, —CONH—, —HN—CO—NH—, R$^6$ is selected from hydrogen and R as defined above, e is 0, 1, 2, 3, 4, 5, 6, 7, or 8, and may be identical or different, R is as defined above and may be identical or different, R$^3$ is as defined above and may be identical or different, d is 0, 1, or 2.

Preferred examples of component (D2) include:

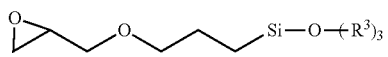

(3e)

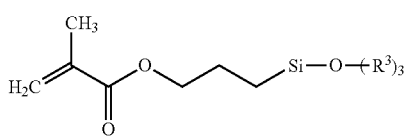

(3f)

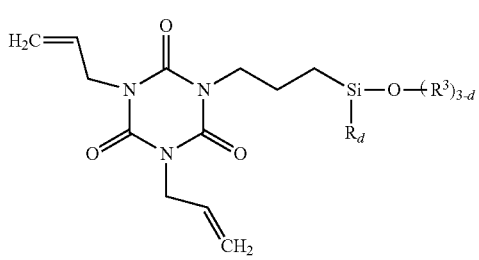

(3g)

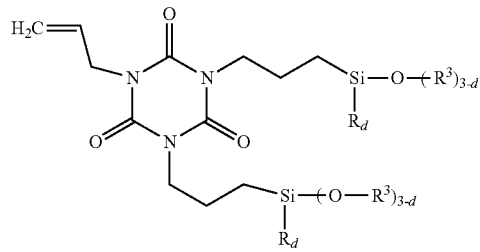

(3h)

wherein R and d are as defined above.

Component (D2) apart from acting as an adhesion promoter, can serve in addition as in-situ surface treating agent for filler (F). It is preferred to use mixtures of silanes of the component (D2) to obtain acceptable adhesion properties at reduced costs.

Component (D3) is preferably selected from compounds of the formula (3i):

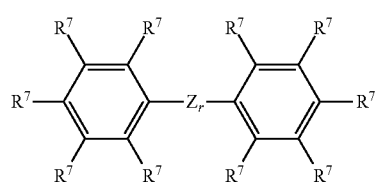

(3i)

wherein r is 0 or 1,

R$^7$ may be the same or different group, which is selected from the group consisting of a hydrogen atom, a hydroxyl group, a halogen atom, an alkyl group, alkenyl group, alkoxy group, alkenyloxy group, alkenylcarbonyloxy group and an aryl group, and a group of formula -E$_r$-Si(OR)$_{3-d}$R$_d$, wherein R is identical or different, and d is as defined above, a group of formula —O—Si(R)$_2$R$^1$, wherein R and R$^1$ are as defined above, a group of formula -E$_r$-Si(R)$_2$H, wherein R is as defined above, wherein E is a divalent organic group with up to 8 carbon atoms and 0 to 3 hetero atomic groups selected from —O—, —NH—, C=O, and —C(=O)O—, and f is 0 or 1, and Z is selected from the following groups:

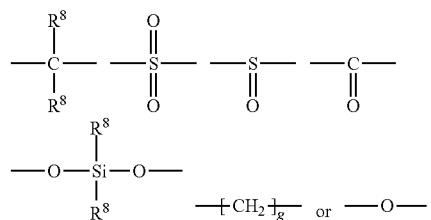

wherein R$^8$ is selected from the group of a hydrogen atom, a halogen atom, or a substituted or unsubstituted alkyl group, aryl group, alkenyl group and alkynyl group, and g is a positive number of at least 2, wherein at least one of the groups selected from $R^7$ and $R^8$ is reactive in hydrosilylation.

Preferred components (D3) include:

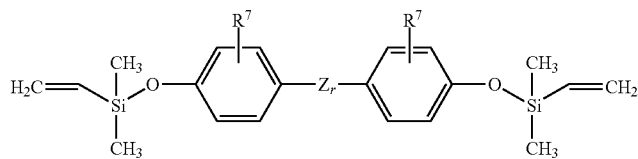

(3k)

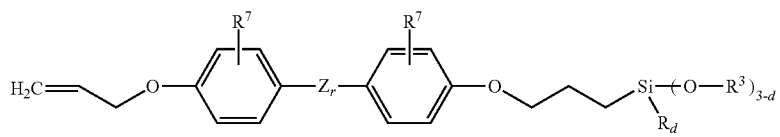

(3l)

wherein $Z_r$, $R^7$, $R^3$, R and d are each as defined above).

The auxiliary or conventional additives can further comprise stabilizers against hot air, oils and solvents, process aids, mould release agents, wettings agents, pigments, all kind of fillers that are different from reinforcing filler component (F), such as functional fillers for increased heat or electrical conductivity, low surface or inert fillers so-called extenders for extended volume, solvents, natural or synthetic fibers optionally for reinforcement (which fibers are not included in component (F) e.g. polyester fiber, cellulose fiber (cotton fiber), polyamide fiber such as Nylon fiber, polyurethane fiber such as Spandex fiber, glass fiber, etc., blowing agents to initiate foaming, anti-microbial, fungicides or additive for increasing mildew resistance.

The auxiliary or conventional additives can further comprise a plasticizer or softener, which is preferably selected from silicone oils, preferably diorganopolysiloxanes; comprising [$R_2SiO$]-units, with R being a C—Si bonded organic group. Silicone oils are usually clear, colorless, non-toxic, inert, odorless, chemically inert, thermally stable, hydrophobic liquids having a number average molecular weight of preferably 162-150000 g/mol, a density from 0.76 to 1.07 g/cm$^3$ and viscosities from 0.6 to 1,000,000 mPa·s (20° C.). Preferred silicone oils include polydimethylsiloxane oils. The use of such silicone oils is preferred to achieve Shore A hardness of ≤20.

Examples of materials serving as fillers or extenders (BET-surface areas <50 m$^2$/g) are known as non-reinforcing fillers. They include for example powdered quartz, diatomaceous earths, powdered crystoballites, micas, aluminum oxides, and aluminum hydroxides. Titanium dioxides or iron oxides, Zn oxides, chalks, or carbon blacks whose BET surface areas are from 0.2 to less than 50 m$^2$/g can be used also as heat stabilizer. These fillers are available under variety of trade names, examples being Sicron®, Min-U-Sil®, Dicalite®, Crystallite®. The materials known as inert fillers or extenders with BET surface areas below 50 m$^2$/g should advantageously comprise no particles (<0.005% by weight) above 100 μm for use in silicone rubbers, in order that further processing generates no problems during downstream processing, e.g. passage through sieves or nozzles, or the mechanical properties of the articles produced therefrom are adversely affected.

Among the opacifying fillers are also in particular non-transparent, in particular inorganic, pigments or carbon black.

The use of these opacifying fillers is preferred only when pigmentation is necessary or the physical function like thermal or electrical conductivity is a requirement.

The use of opaque non-transparent fillers requires changing the usual sequence of the activation and shaping steps in the process. Normally, if no or transparent fillers are used, the photo-activation through irradiation is carried out after the final shaping process. If opaque non-transparent fillers, which would inhibit the photo-activation of the photo-activatable catalyst, are used, the photo-activation step is carried out before the opaque non-transparent fillers are incorporated and the mixture is shaped.

As the person skilled in the art knows, filler can also be a pigment, e.g. organic dyes or pigments or inorganic pigments.

The auxiliary or conventional additives further include e.g. plasticizers, or release oils, or hydrophobicizing oils, such as polydimethylsiloxane oils having a viscosity which is preferably 0.001-10 Pa·s at 25° C. Additional mould-release or flow improving agents can also be used, examples being fatty acid derivatives or fatty alcohol derivatives, fluoroalkyl surfactants. Compounds advantageously used here are those, which separate rapidly and migrate to the surfaces. Stability after exposure to hot air can by way of example be increased using known hot-air stabilizers, such as Fe-, Mn-, Ti-, Ce- or La-compounds, and organic salts of these, preferably their organic complexes.

The auxiliary additives may also include so-called inhibitors for controlling the crosslinking reaction. It is intended to extent the pot-life of the silicone composition to be shaped. The use of such inhibitors may be suitable to decrease the cure rate. Examples of advantageous inhibitors include for example vinyl-siloxanes, such as 1,3-divinyltetramethyldisiloxane, or tetravinyl-tetramethyl-tetracyclosiloxanes. It is also possible to use other known inhibitors, for example ethynylcyclohexanol, 3-methylbutynol, or dimethylmaleate. In a preferred embodiment of the invention the addition-curable silicone rubber composition contain at least one inhibitor for controlling the crosslinking reaction to decrease the cure rate and to extend pot-life of the addition-curable silicone rubber composition.

In a preferred embodiment addition-curable silicone rubber composition according to the invention the component G) is selected from the group of an inhibitor; a plasticizer or softener, preferably selected from a silicone oil, more preferably selected from a polydimethylsiloxane oil; non-reinforcing fillers, preferably selected from fine ground silica or quartz; fiber materials, such as polyester fiber, cellulose fiber, polyamide fiber such as Nylon fiber, polyurethane fiber such as Spandex fiber, and glass fiber.

In a further particular embodiment the addition-curable silicone rubber composition of the invention comprises at least one fiber material. Especially if those fiber materials contain residual SiH-reactive groups, such as hydroxyl groups, adhesion to such materials is improved similarly as to the carrier materials.

In a further particular embodiment the addition-curable silicone rubber composition of the invention comprises at least one inhibitor.

In a further particular embodiment the addition-curable silicone rubber composition of the invention comprises at least one plasticizer or softener.

In a further particular embodiment the addition-curable silicone rubber composition of the invention comprises at least one polyorganosiloxane resin component (A3) as described above.

The molar ratio of the total of SiH groups in the composition to the total of alkenyl groups in the composition is between 0.8 and 5, preferably 0.9 to 4, more preferably 1 to 2.5, more preferably 1.1 to 2.2 in order to provide good adhesion to the hydroxyl-group containing substrates.

The composition of the present invention can be prepared by homogeneously mixing components (A)-(G) using suitable mixing means, such as spatula, a drum roller, a mechanical stirrer, a three roll mill, a sigma blade mixer, a dough mixer, a planetary mixer, a horizontal mixer, screws, dissolver, butterfly mixer, press mixer, or a vacuum mixer.

The order of mixing components (A)-(G) is not critical, however, it is preferred that certain components can be mixed to form two or more packages which can be stored, if desired, and then mixed in a final step immediately prior to the intended use thereof.

The addition-curable silicone rubber composition according to the invention preferably comprise
 100 parts by weight of component (A),
 0.01 to 100 parts by weight of component (B), preferably 0.5 to 50 parts by weight
 0.5 to 1000 ppm, preferably 1 to 100 ppm of component (C) based on the weight amount of the transition metal and based on the total weight of components (A) and (B),
 0.01 to 10 parts by weight of component (D), preferably 0.02 to 5 parts by weight of component (D), more preferably 0.05 to 2 parts by weight of component (D), more preferably 0.1 to 1.75 parts by weight of component (D),
 0.01 to 10 parts by weight of component (E), preferably 0.01 to 5 parts by weight of component (E), more preferably 0.02 to 1 parts by weight of component (E), more preferably 0.03 to 0.75 parts by weight of component (E), more preferably 0.05 to 0.5 parts by weight of component (E),
 0 to 100 parts by weight of component (F), preferably 1 to 50 parts by weight of component (F) and
 0 to 100 parts by weight of component (G), preferably 0.001 to 15 parts, preferably from 0.002 to 6 parts by weight of the component (G).

In a preferred embodiment the addition-curable silicone rubber composition according to the invention comprises per 100 parts by weight of the component (A):
 0.05 to 2 parts by weight of component (D), preferably 0.1 to 1.75 parts by weight of component (D), and/or
 0.02 to 1 parts by weight of component (E), preferably 0.03 to 0.75 parts by weight of component (E), more preferably 0.05 to 0.5 parts by weight of component (E).

The present invention further relates to cured silicone rubber composition, obtained by curing the addition-curable silicone rubber composition as defined above. Curing may be effected by providing heat or irradiation. Preferably curing is effected by heating the addition-curable silicon rubber composition to temperature of at least 80° C., preferably at least 100° C., for preferably at least 2 minutes, preferably at least 5 minutes.

The present invention further relates to the use of the addition-curable silicone rubber composition as defined above for the manufacture of a composite material, comprising a substrate and the cured silicone rubber composition on at least one part of the surface of the substrate. The substrate maybe also completely coated. Also sandwich structures are possible, connecting more than one piece of the substrate with each other.

The present invention further relates to the composite material, comprising a substrate and the cured silicone rubber composition as defined above on at least part of the surface of such substrate.

The thickness of the cured silicon rubber composition on at least one part of the surface of the substrates may be for example in the range of 1 µm to 10 cm, preferably 1 mm to 5 cm.

Substrates to be coated are for example selected from acrylonitrile-butadiene-styrene (ABS) resins, styrene resins, polyethylene resins, polypropylene resins, polyacetal resins, acrylic resins, polyethylene terephthalate, polybutylene terephthalate, polyphenylene sulfide resins, polyimide resins, polycarbonate, polyester, polyurethane, poly(phenylene oxide), polysulfone, polyvinylalcohol, phenolic resin, epoxy resin, polyamide, polyetherimide, cellulose, glass and the mixture thereof.

The substrates to be coated are preferably selected from materials that have residual hydrosilyl-reacting groups (i.e. Si—H-reactive groups), such as hydroxyl groups, at the surface thereof. Such substrates include for example polymers, in the preparation of which alcohols, in particular polyols are used, leading to unreacted hydroxyl groups at the surface of the substrates. Such polymers include in particular polycarbonates, polyesters, polyurethanes, poly(phenylene oxide), polysulfones, polyvinylalcohols, phenolic resins, epoxy resins preferably polycarbonates.

Furthermore glass and cellulose are suitable substrates to be coated with the addition-curable silicone rubber composition of the invention.

The present invention further relates to a method of manufacturing said composite material, wherein the substrate that contains residual functional groups, preferably SiH-reactive groups such as hydroxyl groups on the surface thereof is coated with the addition-curable silicone rubber composition as defined above and thereafter the addition-curable silicone rubber composition is preferably thermally cured on the surface of said substrate. Said residual functional groups, preferably SiH-reactive groups such as hydroxyl groups are supposed to react with SiH groups from the silicone rubber composition. In a preferred embodiment of such method it comprises the molding of the thermoplastic resin and thereafter the addition-curable silicone rubber composition as defined above is over-molded onto the thermoplastic part in the same molding equipment and cured. Such processes for example include two-shot or multiple-shot over-molding processes. Most preferred the addition-curable silicone rubber composition according to the invention is directly coated on the surface of the substrate, that is, there is no primer applied first on the substrate.

Without being bound to theory this invention is supposed to unveil the synergy between the organosilicon compound (D) (OSC) and the aromatic diallyl compound (E) (DAC), which enables in particular the bonding of LSR to any substrate that contains residual hydroxyl groups on its surface, including for example polycarbonate, polyester and glass. The aromatic diallyl compounds (E) are supposed to be immiscible with LSR and therefore migrate to the LSR surface. As the aromatic diallyl compounds (E) can chelate the platinum catalyst dispersed in the LSR bulk they have it concentrated at the LSR/substrate interface due to aromatic diallyl compound (E)'s immiscibility with LSR. The enrichment of platinum at the interface then promotes the dehydrogenative condensation reaction between the Si—H group

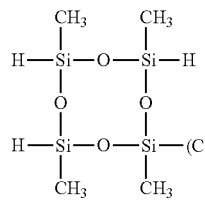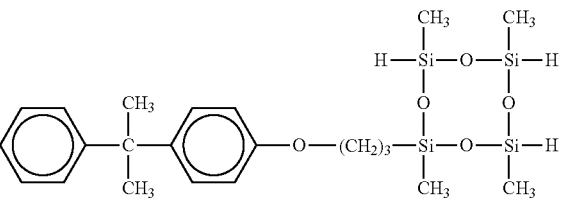

from the organosilicon compound (D) and the residual OH groups on the substrate surface. In the meantime, both the organosilicon compound (D) and the aromatic diallyl compound (E) will be attached to the silicone matrix (such as PDMS) through hydrosilylation; and as a result, covalent bonds are generated between LSR and the substrate (see FIG. 1). According to this understanding the bonding essentially would not occur at a silicone/metal interface due to the lack of OH group on metal surface. The chelating strength between the aromatic diallyl compound (E) and Pt is supposed to be not too strong, so as to behave as an inhibitor to the bonding reactions. In the absence of the aromatic diallyl compound (E) the catalytic Pt concentration at the interface may be too low to facilitate the reaction effectively. Accordingly the supposed mechanism of the present invention lies in the surface enrichment of catalytic platinum via an LSR-incompatible aromatic diallyl compound (E), which promotes the bonding reaction between the LSR and the substrate, but essentially does not act as a hydrosilylation catalyst inhibitor, thereby eliminating the need for a primer use during injection molding or over-molding processes.

The addition-curable silicone rubber compositions of the invention can be used in various applications for example in the manufacture of mobile phone cases, mobile gaskets, safety masks, electronic accessories, tools, aerospace, packaging and automotive. A particular field of application is the use as self bonding LSR for PC in particular in primer-less solutions (when no primer is applied previously). The addition-curable silicone rubber compositions of the invention may be used in making articles waterproof, for making aesthetic designs, for making protections to electronics. Further applications include coated articles for seals in mechanical engineering, automotive applications, electrical goods such as insulators, keyboards, food packaging such as bottle caps, coffee capsules, closing or dosing caps or closing or metering valves, respectively, food containers, kitchen appliances such as dough scrapers, plates, bowls, diving masks, face masks, teethers, baby suckers, furniture, shelves, design objects which are haptically designed with silicone elastomers, applications for textiles and shoes, brand emblems, sports and recreational equipment such as watch straps, tools, tool handles, syringe plungers, intravenous valves, scrapers or spatulas, implants, tubes or valves optionally with integrated flange elements, tubes with integrated pipe bends.

The present invention is explained in more detail in the following examples.

EXAMPLES

Synthesis Example 1

The general method of making the OSC-1 molecule is described as follows:

A 500 mL, 4-necked round bottom flask was equipped with a condenser, an addition funnel and a thermometer and an overhead stirrer. 38.9 g of cyclic tetramethyltetrasiloxane and 80 mL toluene were charged to the flask at room temperature. Temperature was raised to 80° C. using an oil bath. 2 ppm of chloroplatinic acid was then added to the solution. The mixture was stirred at 350 rpm using the overhead stirrer. 10 g of bisphenol A bisallyl ether was diluted with 40 mL toluene and placed in the addition funnel. The diluted bisphenol bisallyl ether was added dropwise to the mixture at a rate of 2 drops/minute under stirring over 10 hours. The reaction mixture was stirred for another 6 hours at 80° C. $^1$H NMR spectrum indicated the disappearance of alkene peaks between 5-6.5 ppm. 3 g charcoal was then added to the mixture and stirred at 80° C. for 30 min. The solution was filtered through Buchner funnel with Whatmann filter paper packed with 3 g of celite using a water aspirator. The toluene was distilled from the filtrate in a rotovap at 90° C. under vacuum of 20 mbar. A light yellowish liquid product was obtained. Both NMR and FTIR spectra confirmed the OSC-1 structure.

Examples 1-9 and Comparative Examples 1-5

A silicone rubber base compound was prepared according to the state of the art in a mixer containing two sets of knitting agitators from 7 parts of dimethylvinylsilyl-terminated polydimethylsiloxane having a viscosity of 10 Pa·s (Silopren* U10 from Momentive Performance Materials), 46 parts of dimethylvinylsilyl-terminated polydimethylsiloxane having a viscosity of 65 Pa·s (Silopren* U65), 5.25 parts of hexamethyldisilazane, 0.35 parts of divinyltetramethyldisilazane, 22.5 parts of fumed silica having a Brunauer-Emmett-Teller (BET) specific surface area of 300 m²/g (Aerosil® 300 from Evonik) and water, by first mixing at 100° C., then stripping to 150° C. under vacuum (<80 mbar)) to achieve an uniformly mixed material. The mixture was then cooled and diluted with 11.5 part of Silopren* U10 to produce ca. 89.7 parts of silicone base compound.

The silicone base compound was further mixed with other components listed in Table 1 to prepare various rubber formulations (parts and figures refer to weight or weight parts per hundred (pph)). Silopren* V5000 is dimethylvinylsiloxy-terminated poly(dimethylsiloxane-co-methylvinylsiloxane) having a vinyl content of 0.85 mmol/g and a viscosity of 5 Pa·s. H-crosslinker 1 is trimethylsilyl-terminated poly(dimethylsiloxane-co methylhydrosiloxane) having a SiH content of 2.4 mmol/g and a viscosity of 0.02 Pa·s. H-crosslinker 2 is another trimethylsilyl-terminated poly (dimethylsiloxane-co methylhydrosiloxane) with a higher SiH content of 7.3 mmol/g and a viscosity of 0.04 Pa·s. H-extender is a dimethylhydrosilyl-terminated polydimethylsiloxane with a SiH content of 1.4 mmol/g and a viscosity of 0.015 Pa·s. ECH is the inhibitor ethynyl cyclohexanol. OSC-1 is the organosilicon compound made in synthesis example 1 and contains ca. 7 mmol/g SiH. DAC compounds tested in the examples include 2,2'-diallyl bisphenol A, and bisphenol A diallyl ether. Ester group-containing compounds with unsaturated hydrocarbyl groups tested for comparison included: diallyl maleate, tetraallyl pyromellitate, 2,2'-diallyl bisphenol A diacetate ether, allyl benzoate, and dodecyl acrylate. The Pt catalysts employed in the examples include an Ashby's catalyst containing 2 wt % Pt, a Karstedt's catalyst containing 10 wt % Pt, and a Lamoreaux catalyst containing 3.3 wt % Pt. The Pt catalyst was added last when all the other ingredients had been mixed. The molar ratio of all SiH to all vinyl groups (in SiVi and in DAC) in the composition in the examples was controlled in the range of 1.1-2.7.

Each rubber formulation was applied to a thickness of ca. 1 mm between a Lexan™ 121 (supplied from SABIC) polycarbonate (PC) bar and an aluminum (Al) metal bar and then placed in a 120° C. oven for 10 min to cure. The sandwiched assembly was dissembled with force in the oven right after vulcanization, to test for adhesion to both PC and Al substrates at 120° C. If the Al bar or PC bar could be pried off from cured silicone rubber with no obvious rubber residual on Al or PC surfaces at 120° C., the rubber formulation is considered no adhesion to Al or PC at 120° C., respectively. It is considered bonding to Al or PC if Al bar or PC bar cannot be peeled off from cured rubber at 120° C. Each formulation was tested at least five times, and the success rate (in %) of adhesion to each substrate at 120° was illustrated in Table 1 (>90%=no adhesion failure). The sandwiched assembly was also cooled down to room temperature (ca. 23° C.) and then dissembled with force at room temperature. The success rate (in %) of adhesion to each substrate at ca. 23° C. was also illustrated in Table 1 (>90%=no adhesion failure), with a sample size of at least five for each formulation.

For a rubber sample that has no adhesion to PC at 120° C., it would be considered not applicable for multicomponent molding processes, as the cured silicone rubber is likely delaminated from the PC substrate during the demolding step at 120° C., yielding a defect in production. Lack of bonding to metal substrates at 120° C., on the other hand, is desired for multicomponent molding processes, as the rubber sample needs to be completely demolded from metal mold during the process.

Rubber formulations incorporating 0.6-1.2 wt % OSC-1 but no DAC compound (comparative examples 1 and 5) failed to give adhesion to PC at 120° C., though the adhesion was gained when the samples were completely cooled down to room temperature. Implementing additional ester group-containing compounds did not improve its bonding to PC at 120° C. at all (see comparative example 2, 3, 4, 6, 7, 8 and 9). Most of these formulations (except comparative examples 7 and 8) did yield adhesion to PC at room temperature, but none generated adequate bonding at 120° C. These comparative examples would likely generate delaminated and thus defective articles during typical multicomponent molding processes.

Rubber formulations with the DAC compound but no OSC-1 (comparative example 10) or with the ester group-containing compound with unsaturated hydrocarbyl groups but no OSC-1 (comparative example 11) failed to give adhesion to PC at both 120° C. and room temperature.

Rubber formulation with both OSC-1 and addition of 0.12 wt % to 1.0 wt % of the DAC compounds gave excellent adhesion to PC at both 120° C. and room temperature, as clearly demonstrated in examples 1 to 8. These aromatic and non-ester containing DAC compounds include 2,2'-diallyl bisphenol A and bisphenol A diallyl ether. Clearly, both OSC-1 and DAC compounds are required to generate adequate bonding to PC at 120° C. Without being bound by theory, a possible synergistic mechanism for adhesive bonding in the presence of both OSC-1 and DAC compounds is shown in FIG. 1.

Supplementing additional 0.24 wt % to 1.0 wt % of DAC compounds to comparative examples 3, 4, 8 and 9, which already comprised OSC-1 and ester group-containing compounds, gave excellent adhesion to PC at 120° C. (see examples 9-13). The result further attests that a silicone rubber composition needs both OSC-1 and DAC to work synergistically to produce adhesion to PC at elevated temperatures.

For the rubber composition with higher crosslinking density (examples 6, 7, 8, 11, 12 and 13 using H-crosslinker 2), higher amount of DAC (e.g. 0.5 wt %) is preferred in order to produce adequate bonding to PC. However, when DAC content is 1 wt % or higher, the sample could become brittle (see example 8 and comparative example 7). Embrittlement will yield defective articles during multicomponent molding processes. In addition, mold fouling issue is more likely to occur when higher amount of non-compatible additives (e.g., DAC) are employed in the silicone rubber composition.

TABLE 1

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Composition in pph | | | | | | | | | | | | | |
| Silicone base compound | 89.62 | 89.62 | 89.68 | 89.66 | 89.64 | 82.00 | 82.00 | 82.00 | 89.40 | 89.40 | 82.00 | 82.00 | 82.00 |
| Silopren* U65 | | | | | | 5.68 | 6.28 | 5.78 | | | 5.18 | 5.18 | 4.68 |
| Silopren* V5000 | 4.40 | 4.40 | 4.40 | 4.40 | 4.40 | 6.65 | 6.65 | 6.65 | 4.40 | 4.40 | 6.65 | 6.65 | 6.65 |
| H-crosslinker 1 | 5.17 | 5.17 | 5.17 | 5.17 | 5.17 | | | | 5.17 | 5.17 | | | |
| H-crosslinker 2 | | | | | | 2.50 | 2.50 | 2.50 | | | 2.50 | 2.50 | 2.50 |
| H-extender | | | | | | 1.40 | 1.40 | 1.40 | | | 1.40 | 1.40 | 1.40 |

TABLE 1-continued

| | | | | | | | | | | | | | | |
|---|---|---|---|---|---|---|---|---|---|---|---|---|---|---|
| ECH | | 0.04 | 0.04 | 0.04 | 0.04 | 0.04 | 0.04 | 0.04 | 0.04 | 0.04 | 0.04 | 0.04 | 0.04 | 0.04 |
| OSC-1 | | 0.60 | 0.60 | 0.60 | 0.60 | 0.60 | 1.20 | 0.60 | 0.60 | 0.60 | 0.60 | 1.20 | 1.20 | 1.20 |
| DAC | 2,2'-diallyl bisphenol A | 0.12 | | | 0.12 | 0.12 | 0.50 | | | | | | | |
| | bisphenol A diallyl ether | | 0.12 | 0.06 | | | | 0.50 | 1.00 | 0.24 | 0.24 | 0.50 | 0.50 | 1.00 |
| Ester-group | diallyl maleate | | | | | | | | | | | | | |
| containing | tetraallyl pyromellitate | | | | | | | | 0.12 | | | | | |
| compounds | 2,2'-diallyl bisphenol A | | | | | | | | | | 0.12 | | | |
| with | diacetate ether | | | | | | | | | | | | | |
| unsaturated | dodecyl acrylate | | | | | | | | | | | 0.50 | | |
| hydrocarbyl | allylbenzoate | | | | | | | | | | | | 0.50 | 0.50 |
| Ashby Pt (2 wt % Pt) | | 0.05 | 0.05 | 0.05 | | | | | | | | | | |
| Karstedt Pt (10 wt % Pt) | | | | | 0.01 | | | | | | | | | |
| Lamoreaux Pt (3.3 wt % Pt) | | | | | | 0.03 | 0.03 | 0.03 | 0.03 | 0.03 | 0.03 | 0.03 | 0.03 | 0.03 |

Parts of components D or E per 100 parts of component A

| | | | | | | | | | | | | | |
|---|---|---|---|---|---|---|---|---|---|---|---|---|---|
| Component D (OSC-1) | 0.87 | 0.87 | 0.87 | 0.87 | 0.87 | 1.68 | 0.83 | 0.84 | 0.87 | 0.87 | 1.70 | 1.70 | 1.71 |
| Component E (DAC) and/or ester-group containing compounds with unsaturated hydrocarbyl | 0.17 | 0.17 | 0.09 | 0.17 | 0.17 | 0.70 | 0.70 | 1.40 | 0.52 | 0.52 | 1.41 | 1.41 | 2.13 |

Adhesion success rate in %

| | | | | | | | | | | | | | |
|---|---|---|---|---|---|---|---|---|---|---|---|---|---|
| Adhesion to PC at 120° C. | >90% | >90% | 60% | >90% | >90% | >90% | >90% | >90% | >90% | >90% | >90% | >90% | >90% |
| Adhesion to Al at 120° C. | 0% | 0% | 0% | 0% | 0% | 0% | 0% | 0% | 0% | 0% | 0% | 0% | 0% |
| Adhesion to PC at 23° C. | >90% | >90% | >90% | >90% | >90% | >90% | >90% | >90% | >90% | >90% | >90% | >90% | >90% |
| Adhesion to Al at 23° C. | 0% | 0% | 0% | 0% | 0% | 0% | 0% | 0% | 0% | 0% | 0% | 0% | 0% |
| Silicone embrittlement | no | no | no | no | no | no | no | yes | no | no | no | no | no |

| | | Comparative examples | | | | | | | | | | |
|---|---|---|---|---|---|---|---|---|---|---|---|---|
| | | 1 | 2 | 3 | 4 | 5 | 6 | 7 | 8 | 9 | 10 | 11 |

Composition in pph

| | | | | | | | | | | | | |
|---|---|---|---|---|---|---|---|---|---|---|---|---|
| Silicone base compound | | 89.74 | 89.66 | 89.64 | 89.64 | 82.00 | 82.00 | 82.00 | 82.00 | 82.00 | 82.00 | 82.00 |
| Silopren* U65 | | | | | | 6.18 | 5.68 | 5.78 | 5.68 | 5.68 | 6.88 | 6.88 |
| Silopren* V5000 | | 4.40 | 4.40 | 4.40 | 4.40 | 6.65 | 6.65 | 6.65 | 6.65 | 6.65 | 6.65 | 6.65 |
| H-crosslinker 1 | | 5.17 | 5.17 | 5.17 | 5.17 | | | | | | | |
| H-crosslinker 2 | | | | | | 2.50 | 2.50 | 2.50 | 2.50 | 2.50 | 2.50 | 2.50 |
| H-extender | | | | | | 1.40 | 1.40 | 1.40 | 1.40 | 1.40 | 1.40 | 1.40 |
| ECH | | 0.04 | | 0.04 | 0.04 | 0.04 | 0.04 | 0.04 | 0.04 | 0.04 | 0.04 | 0.04 |
| OSC-1 | | 0.60 | 0.60 | 0.60 | 0.60 | 1.20 | 1.20 | 0.60 | 1.20 | 1.20 | | |
| DAC | 2,2'-diallyl bisphenol A | | | | | | | | | | | |
| | bisphenol A diallyl ether | | | | | | | | | 0.50 | | |
| Ester-group | diallyl maleate | | 0.12 | | | | | | | | | |
| containing | tetraallyl pyromellitate | | | 0.12 | | | 0.50 | 1.00 | | | | 0.50 |
| compounds | 2,2'-diallyl bisphenol A | | | | 0.12 | | | | | | | |
| with | diacetate ether | | | | | | | | | | | |
| unsaturated | dodecyl acrylate | | | | | | | | 0.50 | | | |
| hydrocarbyl | allylbenzoate | | | | | | | | | 0.50 | | |
| Ashby Pt (2 wt % Pt) | | 0.05 | 0.05 | | | | | | | | | |
| Karstedt Pt (10 wt % Pt) | | | | | | | | | | | | |
| Lamoreaux Pt (3.3 wt % Pt) | | | | 0.03 | 0.03 | 0.03 | 0.03 | 0.03 | 0.03 | 0.03 | 0.03 | 0.03 |

Parts of components D or E per 100 parts of component A

| | | | | | | | | | | | |
|---|---|---|---|---|---|---|---|---|---|---|---|
| Component D (OSC-1) | 0.87 | 0.87 | 0.87 | 0.87 | 1.67 | 1.68 | 0.84 | 1.68 | 1.68 | 0 | 0 |
| Component E (DAC) and/or ester-group containing compounds with unsaturated hydrocarbyl | 0.00 | 0.17 | 0.17 | 0.17 | 0 | 0.70 | 1.40 | 0.70 | 0.70 | 0.69 | 0.69 |

Adhesion success rate in %

| | | | | | | | | | | | |
|---|---|---|---|---|---|---|---|---|---|---|---|
| Adhesion to PC at 120° C. | 0% | 0% | 15% | 0% | 0% | 0% | 0% | 0% | 0% | 0% | 0% |
| Adhesion to Al at 120° C. | 0% | 0% | 0% | 0% | 0% | 0% | 0% | 0% | 0% | 0% | 0% |
| Adhesion to PC at 23° C. | >90% | >90% | >90% | >90% | >90% | 60% | 0% | 0% | >90% | 0% | 0% |
| Adhesion to Al at 23° C. | 0% | 0% | 0% | 0% | 0% | 0% | 0% | 0% | 0% | 0% | 0% |
| Silicone embrittlement | no | no | no | no | no | no | yes | no | no | no | no |

The invention claimed is:

1. An addition-curable silicone rubber composition, comprising:
   (A) at least one polyorganosiloxane having at least two unsaturated hydrocarbyl residues,
   (B) at least one polyorganohydrogensiloxane selected from one or more polyorganohydrogensiloxanes of the general formula (2):

$$[M^1{}_{a2}D^1{}_{b2}T^1{}_{c2}Q_{d2}Z_{e2}]_{m2} \quad (2)$$

wherein the siloxy units
   $M=R_3SiO_{1/2}$, or $M^{**}$
   $D=R_2SiO_{2/2}$, or $D^{**}$
   $T=RSiO_{3/2}$, or $T^{**}$
   $Q=SiO_{4/2}$,
   $M^{}=HR_2SiO_{1/2}$, $D^{}=HRSiO_{2/2}$, $T^{**}=HSiO_{3/2}$,
   Z is a divalent optionally substituted hydrocarbyl bridging group with up to 14 carbon atoms between two siloxy groups as defined before,
   wherein R is selected from optionally substituted hydrocarbyl groups with up to 30 carbon atoms and poly($C_2$-$C_4$)-alkylene ether groups with up to 1000 alkylene oxy units. the groups R being free of aliphatic unsaturation, and wherein
   a2=2-10
   b2=0-1000
   c2=0-50
   d2=0-5
   m2=1-1000,
   with the proviso that there are at least two groups selected from $M^{}$, $D^{}$ and $T^{**}$,
   (C) at least one hydrosilylation catalyst, comprising a transition metal,
   (D) at least one organosilicon compound containing at least one polyvalent aromatic group, which is not directly attached to a silicon atom, and at least one Si-H group, different from compound B),
   (E) at least one aromatic compound with at least two unsaturated hydrocarbyl groups, which aromatic compound does not contain a siloxane group, and does not contain an ester group,
   (F) optionally one or more reinforcing fillers,
   (G) optionally one or more auxiliary additives.

2. The addition-curable silicone rubber composition, according to claim 1, wherein component (A) is selected from one or more polyorganosiloxanes of the general formula (1):

$$[M_aD_bT_cQ_dZ_e]_m \quad (1)$$

wherein
   a=0-10
   b=0-2000,
   c=0-50
   d=0-10
   e=0-300
   m=1-1000, with
   a+b+c+d+e>2, and
   $M=R_3SiO_{1/2}$, or $M^*$
   $D=R_2SiO_{2/2}$, or $D^*$
   $T=RSiO_{3/2}$, or $T^*$
   $Q=SiO_{4/2}$,
   Z is a divalent optionally substituted hydrocarbyl bridging group with up to 14 carbon atoms between two siloxy groups as defined before,
   wherein R is selected from optionally substituted hydrocarbyl groups with up to 30 carbon atoms and poly($C_2$-$C_4$)-alkylene ether groups with up to 1000 alkylene oxy units. the groups R being free of aliphatic unsaturation, and wherein
   $M^*=R^1{}_pR_{3-p}SiO_{1/2}$,
   $D^*=R^1{}_qR_{2-q}SiO_{2/2}$,
   $T^*=R^1SiO_{3/2}$, wherein
   p=1-3,
   q=1-2, and
   $R^1$ is selected from unsaturated optionally substituted hydrocarbyl groups with up to 30 carbon atoms,
   with the proviso that there are at least two groups selected from $M^*$, $D^*$ and $T^*$.

3. The addition-curable silicone rubber composition, according to claim 1, wherein component (C) is selected from hydrosilylation catalysts comprising platinum.

4. The addition-curable silicone rubber composition, according to claim 1, wherein component (D) is an organosilicon compound comprising one or more straight-chain or cyclic optionally substituted organosiloxane moieties containing 1 to 30 silicon atoms, at least one Si-H group, and at least one polyvalent aromatic group, which is not directly attached to a silicon atom.

5. The addition-curable silicone rubber composition, according to claim 1, wherein the compound (E) is selected from the group consisting of an aromatic compound of the formula (3):

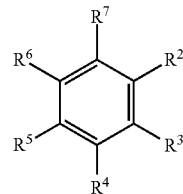

(3)

wherein $R^2$ to $R^7$ are the same or different from each other and are selected from the group consisting of hydrogen, hydroxy, halogen, —$R^8$, wherein $R^8$ is a saturated or unsaturated, optionally substituted hydrocarbyl group with up to 20 carbon atoms, —O—$R^9$, wherein $R^9$ is a saturated or unsaturated optionally substituted hydrocarbyl group with up to 20 carbon atoms,
with the proviso that the compound of formula (3) comprises at least two unsaturated hydrocarbyl groups, and an aromatic compound of the formula (4):

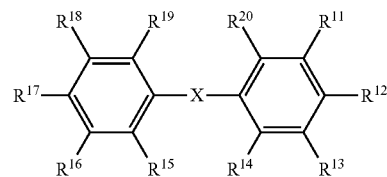

(4)

wherein $R^{11}$ to $R^{20}$ are the same or different from each other and are selected from the group consisting of hydrogen, hydroxy, halogen, —$R^{21}$, wherein $R^{21}$ is a saturated or unsaturated optionally substituted hydrocarbyl group with up to 20 carbon atoms, —O—$R^{22}$, wherein $R^{22}$ is a saturated or unsaturated optionally substituted hydrocarbyl group with up to 20 carbon atoms, and a silyloxy group of the formula —OSiR$^{24}$R$^{25}$R$^{26}$, wherein R$^{24}$, R$^{25}$, and R$^{26}$ are independent from each other selected from an optionally substituted hydrocarbyl group with up to 20 carbon atoms, X is selected from the group consisting of the groups:

single bond,

—R$^{27}$—, wherein R$^{27}$ is a divalent linear or cyclic saturated optionally substituted hydrocarbyl group with up to 20 carbon atoms,

—C(O)—,

—S(O)$_2$—,

—S(O)—,

—S—

—O—Si(R$^{28}$)$_2$—O—, wherein R$^{28}$ is independently selected from the group of a halogen, and a saturated or unsaturated hydrocarbyl group with up to 6 carbon atoms, and

—O— with the proviso that the compound of formula (4) comprises at least two unsaturated hydrocarbyl groups.

6. The addition-curable silicone rubber composition, according to claim 1, wherein the compound (E) is selected from the group consisting of the compounds of the formula:

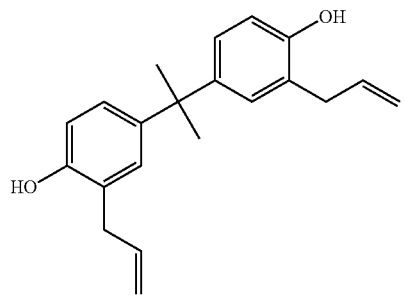 [SMILES: C=CCc1cc(C(C)(C)c2ccc(O)c(CC=C)c2)ccc1O]

(2-allyl-4-[1-(3-allyl-4-hydroxy-phenyl)-1-methyl-ethyl] phenol (2,2'-diallyl bisphenol A))

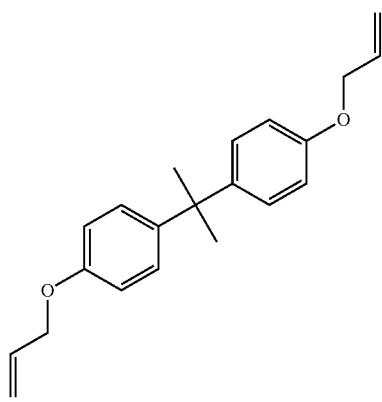 [SMILES: C=CCOc1ccc(C(C)(C)c2ccc(OCC=C)cc2)cc1]

(1-allyloxy-4-[1-(4-allyloxyphenyl)-1-methyl-ethyl]benzene (bisphenol A diallyl ether)))

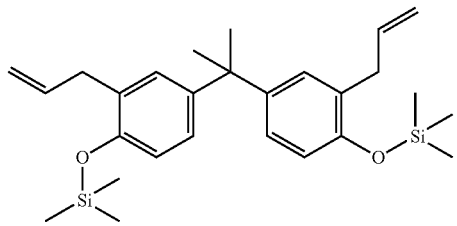 [SMILES: C=CCc1cc(C(C)(C)c2ccc(O[Si](C)(C)C)c(CC=C)c2)ccc1O[Si](C)(C)C]

([2-allyl-4-[1-(3-allyl-4-trimethylsilyloxy-phenyl)-1-methyl-ethyl]phenoxy]-trimethyl-silane)),

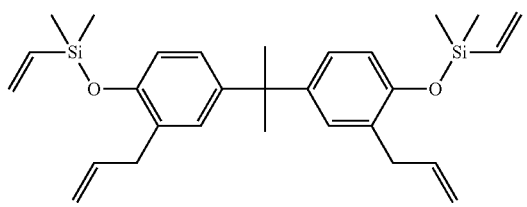 [SMILES: C=CCc1cc(C(C)(C)c2ccc(O[Si](C)(C)C=C)c(CC=C)c2)ccc1O[Si](C)(C)C=C]

([2-allyl-4-[1-[3-allyl-4-[dimethyl(vinyl)silyl]oxy-phenyl]-1-methyl-ethyl]phenoxy]-dimethyl-vinyl-silane).

7. The addition-curable silicone rubber composition according to claim 1, wherein component (F) is selected from reinforcing fillers having a BET surface area of 50 m$^2$/g or more.

8. The addition-curable silicone rubber composition according to claim 1, wherein component (G) is selected from the group of an inhibitor; a plasticizer or softener; non-reinforcing fillers; and/or a fiber material chosen from a polyester fiber, cellulose fiber, polyamide fiber, polyurethane fiber, and/or a glass fiber.

9. The addition-curable silicone rubber composition according to claim 1, comprising:
100 parts by weight of component (A),
0.01 to 100 parts by weight of component (B)
0.5 to 1000 ppm of component (C) based on the weight amount of the transition metal and based on the total weight of components (A) and (B),
0.01 to 10 parts by weight of component (D)
0.01 to 10 parts by weight of component (E),
0 to 100 parts by weight of component (F), and
0 to 100 parts by weight of component (G).

10. The addition-curable silicone rubber composition according to claim 1, comprising per 100 parts by weight of the component (A):
0.05 to 2 parts by weight of component (D), and/or
0.02 to 1 parts by weight of component (E).

11. A cured silicone rubber composition, obtained by curing the addition-curable silicone rubber composition as defined in claim 1.

12. The use of the addition-curable silicone rubber composition as defined in claim 1 for the manufacture of a composite material, comprising a substrate and the cured silicone rubber composition on at least one part of the surface of the substrate.

13. A composite material comprising a substrate and the cured silicone rubber composition as defined in claim 11 on the surface of such substrate.

14. A method of manufacturing a composite material according to claim 13, wherein a substrate that contains residual hydrosilyl-reaction groups is coated with the addition-curable silicone rubber composition as defined in claim 1 and thereafter the addition-curable silicone rubber composition is cured on the surface of said substrate.

15. The composite of claim 13, wherein the substrate is selected from the group consisting of acrylonitrile-butadiene-styrene resins, styrene resins, polyethylene resins, polypropylene resins, polyacetal resins, acrylic resins, polyethylene terephthalate, polybutylene terephthalate, polyphenylene sulfide resins, polyimide resins, polycarbonate, polyester, polyurethane, poly(phenylene oxide), polysulfone, polyvinylalcohol, phenolic resin, epoxy resin, polyamide, polyetherimide, cellulose, glass and the mixture thereof.

16. The method of claim 14, wherein the substrate is a thermoplastic resin, and the method comprises molding the thermoplastic resin and thereafter over-molding and curing the addition-curable silicone rubber composition onto the thermoplastic part in the same molding equipment.

17. The addition-curable silicone composition of claim 1, wherein the at least one polyorganohydrogensiloxane is selected from a siloxane of the formula (2a):

$$H_{a1}(R)_{3-a1}Si[RHSiO]_x[R_2SiO]_y[RR^1SiO]_zSi(R)_{3-a1}H_{a1} \quad (2a)$$

wherein R and R$^1$ are as defined above,
a1 is 0-1,
x=2-1000,
y=0-650,
z=0-65, and
2<x+y+z<1000.

* * * * *